US008738042B2

(12) United States Patent
Lee et al.

(10) Patent No.: US 8,738,042 B2
(45) Date of Patent: May 27, 2014

(54) METHODS, SYSTEMS, AND DEVICES FOR DETERMINING A CLOSEST BASE STATION TO A MULTI-MODE MOBILE DEVICE

(75) Inventors: Kuo-Chun Lee, San Diego, CA (US); Guangming Shi, San Diego, CA (US); Tom Chin, San Diego, CA (US); Steven D. Cheng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/272,168

(22) Filed: Oct. 12, 2011

(65) Prior Publication Data
US 2013/0095831 A1 Apr. 18, 2013

(51) Int. Cl.
*H04W 4/00* (2009.01)

(52) U.S. Cl.
USPC ............ 455/456.6; 455/456.1; 455/436; 455/552.1; 455/553.1; 455/556.2

(58) Field of Classification Search
USPC ............ 455/456.6, 456.1, 436, 552.1, 553.1, 455/550.1, 556.2
See application file for complete search history.

(56) References Cited

U.S. PATENT DOCUMENTS

| 5,546,445 | A | 8/1996 | Dennison et al. | |
|---|---|---|---|---|
| 5,943,014 | A * | 8/1999 | Gilhousen | 342/465 |
| 6,034,635 | A * | 3/2000 | Gilhousen | 342/457 |
| 6,061,337 | A | 5/2000 | Light et al. | |
| 6,246,673 | B1 | 6/2001 | Tiedemann, Jr. et al. | |
| 6,327,471 | B1 | 12/2001 | Song | |
| 6,526,039 | B1 | 2/2003 | Dahlman et al. | |
| 6,937,867 | B2 | 8/2005 | Oda et al. | |
| 7,260,399 | B1 | 8/2007 | Oh et al. | |
| 7,363,009 | B2 | 4/2008 | Erlenbach et al. | |
| 7,974,627 | B2 * | 7/2011 | Mia et al. | 455/440 |
| 7,983,666 | B2 * | 7/2011 | Walley et al. | 455/423 |
| 2004/0110514 | A1 * | 6/2004 | Kim et al. | 455/456.1 |
| 2005/0064877 | A1 * | 3/2005 | Gum et al. | 455/456.1 |
| 2008/0274753 | A1 * | 11/2008 | Attar et al. | 455/456.6 |
| 2009/0088159 | A1 * | 4/2009 | Wu et al. | 455/436 |
| 2009/0291686 | A1 * | 11/2009 | Alpert et al. | 455/436 |
| 2011/0021210 | A1 * | 1/2011 | Medapalli et al. | 455/456.2 |
| 2011/0028161 | A1 * | 2/2011 | Larsen | 455/456.1 |
| 2011/0034171 | A1 * | 2/2011 | Choi et al. | 455/436 |
| 2011/0065453 | A1 | 3/2011 | Baldemair et al. | |
| 2012/0269172 | A1 | 10/2012 | Chin et al. | |

FOREIGN PATENT DOCUMENTS

| EP | 1638360 A1 | 3/2006 |
|---|---|---|
| WO | 9929053 A1 | 6/1999 |

OTHER PUBLICATIONS

International Search Report and Written Opinion—PCT/US2012/059367—ISA/EPO—Mar. 25, 2013.

* cited by examiner

*Primary Examiner* — Kiet Doan
*Assistant Examiner* — Khai M Nguyen
(74) *Attorney, Agent, or Firm* — Tyler J. Overall

(57) ABSTRACT

Embodiments provide methods, systems, and/or devices to identify and/or determine a closest base station to a multi-mode mobile device among the multiple wireless communications technologies, such as different Radio Access Technologies (RATs). Having identified a closest base station to the multi-mode mobile device among the multiple wireless communications technologies, the mobile device's location may be estimated using location information regarding the closest identified base station. In some cases, a handover or other procedure may be performed with respect to the mobile device and the closest identified base station. The multiple wireless communications technologies may include, but are not limited to, WiMAX, CDMA 1x, LTE, and/or EVDO.

40 Claims, 14 Drawing Sheets

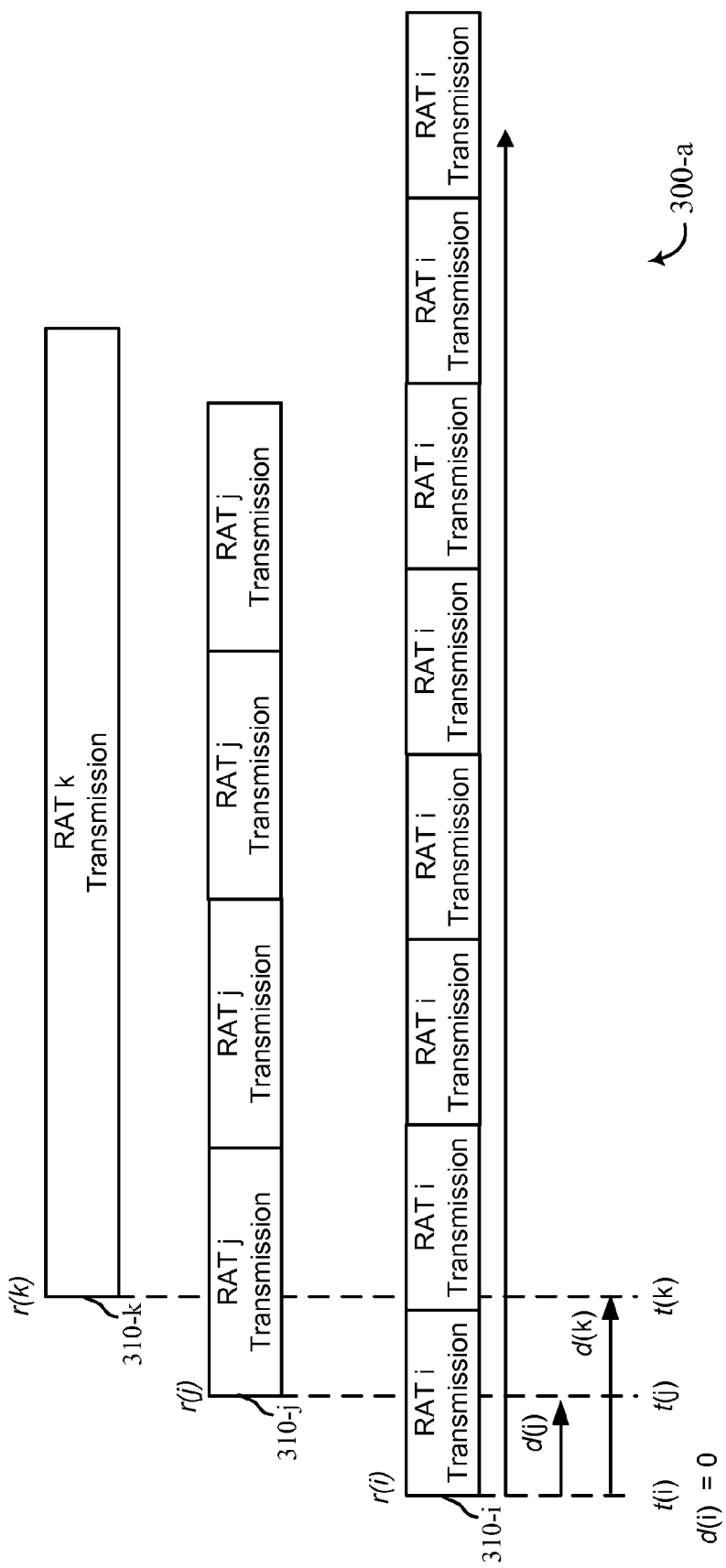

METHODS, SYSTEMS, AND DEVICES FOR DETERMINING A CLOSEST BASE STATION TO A MULTI-MODE MOBILE DEVICE

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, 3GPP Long Term Evolution (LTE) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. Some wireless multiple-access communications systems may utilize different wireless communications technologies or Radio Access Technologies.

SUMMARY

Embodiments provide methods, systems, apparatuses, non-transitory computer-readable media, and/or devices to determine the closest base station to a multi-mode mobile device where the base stations are amongst a group of base stations that utilize different wireless communications technologies, such as different Radio Access Technologies (RATs). The different RATs may include WiMAX, CDMA 1x, LTE, and/or EVDO, for example. The location of the closest base station may be utilized then to estimate the mobile device location. This can be useful when other accurate methods are not available, e.g. GPS and network based trilateration. In some cases, a handover procedure to the closest base station may also be performed.

Identifying or estimating the mobile device position may include determining multiple propagation delays for transmissions with respect to a common reference time from multiple base stations. Each base station may be associated with a different wireless communications technology, such as WiMAX, CDMA 1x, LTE, and/or EVDO. The propagation delays may be compared with each other. A closest base station to the mobile device from the multiple base stations may be identified based on the comparison. In some embodiments, position information for the identified closest base station may be determined The position information for the identified closest base station may be utilized for the mobile device position. In some embodiments, a handover procedure may be performed with respect to the closest base station.

Determining the multiple propagation delays for the base stations may be done in a variety of ways. In some embodiments, multiple event markers may be determined. Each event marker may represent an event associated with a transmission from a respective base station. Multiple receive times may be determined. Each receive time may be associated with a respective event marker. Multiple transmission times may be determined. Each transmission time may be associated with a respective event marker and may be based on a common reference time, such as GPS time. Each respective propagation delay may then be determined utilizing the respective receive time and the respective transmission time for each respective base station.

In some embodiments, the closest base station to the mobile device may be first determined for each of the different wireless technologies. For example, within a given wireless technology, multiple propagation delays from multiple base stations from the given wireless technology may be determined. The multiple propagation delays may be compared. A closest base station to the mobile device from the given wireless technology may be determined based on the comparison. The closest base station associated with the given wireless technology to the mobile device may be utilized as the base station utilized to determine the closest base station amongst the base stations associated with different wireless technologies.

The receive times utilized in some methods may be time differences with respect to a specific receive time. The position information for the identified closest base station may be a GPS position in some embodiments. The event markers may include events such as frame boundaries, frame ticks, and/or a control channel cycle boundaries.

Embodiments may provide methods, systems, and/or device to quickly estimate mobile device location among multiple RATs. Embodiments may reduce the processing while achieving a mobile device location estimation by searching among the multi-RAT networks. In general, the more RATs to use, the less error may incur in the mobile device location estimation.

Some embodiments include a method for determining a closest base station to a multi-mode mobile device. The method may include determining multiple propagation delays with respect to a common reference time between the multi-mode mobile device and each of multiple first base stations. Each of the multiple first base stations may be associated with a different wireless communications technology from multiple wireless communications technologies. The multiple propagation delays between the multi-mode mobile device and the multiple first base stations associated with the different wireless communications technologies may be compared. A closest base station to the multi-mode mobile device from the multiple first base stations may be identified based on the comparison.

Determining the multiple propagation delays may include determining multiple event markers. Each event marker may represent an event associated with a transmission from a respective base station from the multiple first base stations. Determining the multiple propagation delays may include determining multiple receive times. Each receive time may be associated with a respective event marker. Determining the multiple propagation delays may include determining multiple transmission times. Each transmission time may be associated with a respective event marker. Determining the multiple propagation delays may include determining each respective propagation delay utilizing the respective receive time and the respective transmission time for each respective base station from the multiple first base stations.

Each respective transmission time may include a respective GPS time. Each respective receive time may include a time difference with respect to a first receive time from the multiple receive times. The first receive time may be the common reference time. The multiple event markers may include at least a frame boundary, a frame tick, or a control channel cycle boundary.

The multiple wireless communications technologies may include at least two of WiMAX, CDMA 1x, LTE, or EVDO.

The multiple wireless communications technologies may include multiple Radio Access Technologies (RAT).

In some embodiments, the method for determining the closest base station to the multi-mode mobile device may further include determining position information for the identified closest base station. The position information for the identified closest base station from the multiple first base stations may be utilized as a position of the multi-mode mobile device. In some embodiments, the method for determining the closest base station to the multi-mode mobile device may further include performing a handover procedure of the multi-mode mobile device to the identified closest base station.

The position information for the identified closest base station may include a GPS position of the identified closest base station. Utilizing the position information for the identified closest base station from the multiple first base stations as the multi-mode mobile device position may include estimating the mobile device position based on the position information for the identified closest base station.

In some embodiments, the method for determining the closest base station to the multi-mode mobile device may further include determining multiple propagation delays between the multi-mode mobile device and multiple second base stations. Each base station of the multiple second base stations may be associated with a first wireless communications technology from the multiple wireless communications technologies. The multiple propagation delays between the multi-mode mobile device and the multiple second base stations associated with the first wireless communications technologies may be compared. A closest base station to the multi-mode mobile device from the multiple second base stations may be identified based on comparing the multiple propagation delays between the multi-mode mobile device and the multiple second base stations associated with the first wireless communications technologies. The closest base station to the multi-mode mobile device from the multiple base stations may be utilized as one of the base stations from the multiple first base stations.

In some embodiments, determining the multiple propagation delays, comparing the multiple propagation delays, and/or identifying the closest base station to the multi-mode mobile device may occur at the multi-mode device. Information regarding the closest base station may be transmitted from the multi-mode device to at least one the multiple first base stations or a core network.

In some embodiments, determining the multiple propagation delays, comparing the multiple propagation delays, and/or identifying the closest base station to the multi-mode mobile device may occur at a first base station from of the multiple first base stations. Determining the multiple propagation delays at the first base station may include receiving multiple receive times transmitted from at least the multi-mode mobile device or one or more of the other base stations from the multiple first base stations. The first base station may determine multiple transmission times. The first base station may determine each respective propagation delay utilizing the respective receive time and the respective transmission time for each respective base station from the multiple first base stations.

In some embodiments, determining the multiple propagation delays, comparing the multiple propagation delays, and/or identifying the closest base station to the multi-mode mobile device may occur at a core network device.

Some embodiments include an apparatus for determining a closest base station to a multi-mode mobile device. The apparatus may include: a means for determining a multiple propagation delays with respect to a common reference time between the multi-mode mobile device and each of a multiple first base stations. Each of the multiple first of base stations may be associated with a different wireless communications technology from multiple wireless communications technologies. The apparatus may include a means for comparing the multiple propagation delays between the multi-mode mobile device and the multiple first base stations associated with the different wireless communications technologies. The apparatus may include a means for identifying a closest base station to the multi-mode mobile device from multiple first base stations based on the comparison.

In some embodiments, the apparatus may further include a means for determining a position information for the identified closest base station; and/or a means of utilizing the position information for the identified closest base station from the multiple first base stations as a position of the multi-mode mobile device. In some embodiments, the apparatus may further include a means for performing a handover procedure of the multi-mode mobile device to the identified closest base station.

Some embodiments include a wireless communications device configured for determining a closest base station to a multi-mode mobile device. The wireless communications device may include a propagation delay determination module configured to determine multiple propagation delays with respect to a common reference time between the multi-mode mobile device and each of multiple first base stations. Each of the multiple first base stations may be associated with a different wireless communications technology from multiple wireless communications technologies. The device may include a propagation delay comparison module configured to compare the multiple propagation delays between the multi-mode mobile device and the multiple first base stations associated with the different wireless communications technologies. The device may include a closest base station identification module configured to identify a closest base station to the multi-mode mobile device from the multiple first base stations based on the comparison.

In some embodiments, the wireless communications device may further include a position information module configured to: determine a position information for the identified closest base station; and/or utilize the position information for the identified closest base station from the multiple first base stations as a position of the multi-mode mobile device. In some embodiments, the wireless communications device may further include a handover module configured to perform a handover procedure of the multi-mode mobile device to the identified closest base station.

The position information for the identified closest base station may include a GPS position of the identified closest base station. Utilizing the position information for the identified closest base station from the multiple first base stations as the multi-mode mobile device position may include estimating the mobile device position based on the position information for the identified closest base station.

Determining the multiple propagation delays may include determining multiple event markers. Each event marker may represent an event associated with a transmission from a respective base station from the multiple first base stations. Determining the multiple propagation delays may include determining multiple receive times. Each receive time may be associated with a respective event marker. Determining the multiple propagation delays may include determining multiple transmission times. Each transmission time may be associated with a respective event marker. Determining the multiple propagation delays may include determining each respective propagation delay utilizing the respective receive time and the respective transmission time for each respective base station from the multiple first base stations.

Each respective transmission time may include a respective GPS time. Each respective receive time may include a time difference with respect to a first receive time from the multiple receive times. The first receive time may be the common reference time. The multiple event markers may include at least a frame boundary, a frame tick, or a control channel cycle boundary.

The multiple wireless communications technologies may include at least two of WiMAX, CDMA 1x, LTE, or EVDO. The multiple wireless communications technologies may include multiple Radio Access Technologies (RAT).

In some embodiments, the propagation delay determination module may be further configured to determine multiple propagation delays between the multi-mode mobile device and multiple second base stations. Each station of the multiple second base stations may be associated with a first wireless communications technology from the multiple wireless communications technologies. The propagation delay comparison module may be further configured to compare the multiple propagation delays between the multi-mode mobile device and the multiple second base stations associated with the first wireless communications technologies. The closest base station identification module may be further configured to identify a closest base station to the multi-mode mobile device from the multiple second base stations based on comparing the multiple propagation delays between the multi-mode mobile device and the multiple second base stations associated with the first wireless communications technologies. The device may further include a position information module configured to utilize the closest base station to the multi-mode mobile device from the multiple second base stations as one of the base stations from the multiple first base stations.

In some embodiments, the wireless communications device includes the multi-mode mobile device. The wireless communications device may further include a transmitter module configured to transmit information regarding the closest base station from the multi-mode device to at least one of the multiple first base stations or a core network.

In some embodiments, the wireless communications device includes a first base station from the multiple first base stations. The wireless communications device may be configured such that determining the multiple propagation delays at the first base station includes: receiving a multiple receive times transmitted from at least the multi-mode mobile device or one or more of the other base stations from the multiple first base stations; determining a multiple transmission times; and/or determining each respective propagation delay utilizing the respective receive time and the respective transmission time for each respective base station from the multiple first base stations.

In some embodiments, the wireless communications device includes a core network device.

Some embodiments include a computer program product for determining a closest base station to a multi-mode mobile device. The computer program product may include a non-transitory computer-readable medium that may include: code for determining a multiple propagation delays with respect to a common reference time between the multi-mode mobile device and each of multiple first base stations, wherein each of the multiple first base stations is associated with a different wireless communications technology from multiple wireless communications technologies; code for comparing the multiple propagation delays between the multi-mode mobile device and the multiple first base stations associated with the different wireless communications technologies; and/or code for identifying a closest base station to the multi-mode mobile device from the multiple first base stations based on the comparison.

In some embodiments, the computer program product may further include code for determining a position information for the identified closest base station; and/or code for utilizing the position information for the identified closest base station from the multiple first base stations as a position of the multi-mode mobile device. In some embodiments, the computer program product may further include code for performing a handover procedure of the multi-mode mobile device to the identified closest base station.

The foregoing has outlined rather broadly examples according to disclosure in order that the detailed description that follows may be better understood. Additional features will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 3A and 3B illustrate timing diagrams that may be utilized to determine propagation delays in accordance with various embodiments;

DETAILED DESCRIPTION

Figure 1:
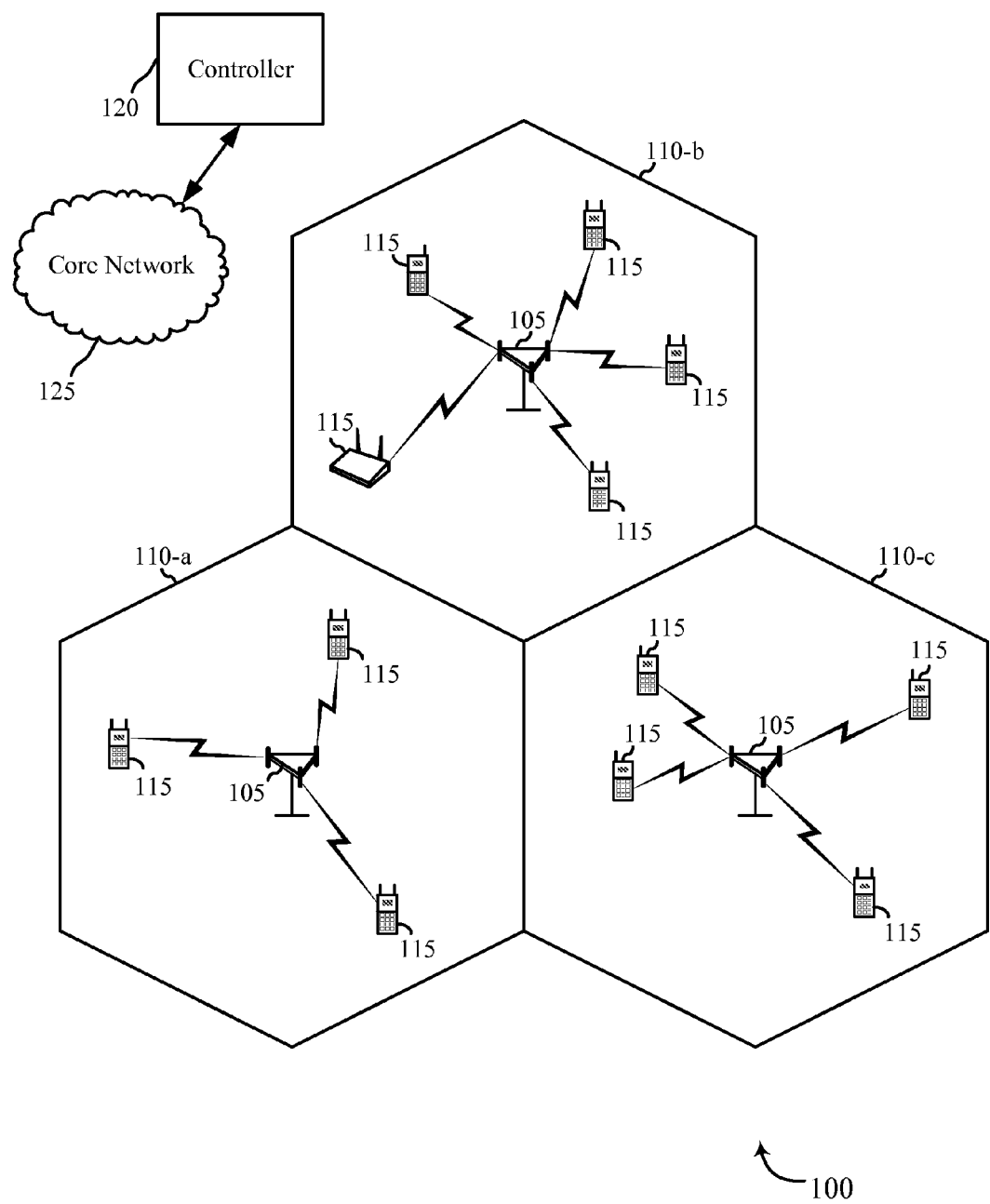
FIG. 1 is a block diagram illustrating a wireless communications system in accordance with various embodiments.

Embodiments provide methods, systems, apparatuses, non-transitory computer-readable media, and/or devices to determine the closest base station to a multi-mode mobile device where the base stations are amongst a group of base stations that utilize different wireless communications technologies, such as different Radio Access Technologies (RATs). The different RATs may include WiMAX, CDMA 1x, LTE, and/or EVDO, for example. The location of the closest base station may be utilized then to estimate the mobile device location. This can be useful when other accurate methods are not available, e.g. GPS and network based trilateration. In some cases, a handover procedure to the closest base station may also be performed.

Identifying or estimating the mobile device position may include determining multiple propagation delays for transmissions with respect to a common reference time from multiple base stations. Each base station may be associated with a different wireless communications technology, such as WiMAX, CDMA 1x, LTE, and/or EVDO. The propagation delays may be compared with each other. A closest base station to the mobile device from the multiple base stations may be identified based on the comparison. In some embodiments, position information for the identified closest base station may be determined. The position information for the identified closest base station may be utilized for the mobile device position. In some embodiments, a handover procedure may be performed with respect to the closest base station.

Determining the multiple propagation delays for the base stations may be done in a variety of ways. In some embodiments, multiple event markers may be determined. Each event marker may represent an event associated with a transmission from a respective base station. Multiple receive times may be determined. Each receive time may be associated with a respective event marker. Multiple transmission times may be determined. Each transmission times may be associated with a respective event marker and may be based on a common reference time, such as GPS time. Each respective propagation delay may then be determined utilizing the respective receive time and the respective transmission time for each respective base station.

In some embodiments, the closest base station to the mobile device may be first determined for each of the different wireless technologies. For example, within a given wireless technology, multiple propagation delays from multiple base stations from the given wireless technology may be determined. The multiple propagation delays may be compared. A closest base station to the mobile device from the given wireless technology may be determined based on the comparison. The closest base station associated with the given wireless technology to the mobile device may be utilized as the base station utilized to determine the closest base station amongst the base stations associated with different wireless technologies.

The receive times utilized in some methods may be time differences with respect to a specific receive time. The position information for the identified closest base station may be a GPS position in some embodiments. The event markers may include events such as frame boundaries, frame ticks, and/or control channel cycle boundaries.

Embodiments may provide methods, systems, and/or devices to quickly estimate mobile device location among multiple RATs. Embodiments may reduce the processing while achieving a mobile device location estimation by searching among the multi-RAT networks. In general, the more RATs to use, the less error may incur in the mobile device location estimation.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a block diagram illustrates an example of a wireless communications system 100. The system 100 includes base transceiver stations 105, disposed in cells 110, mobile device 115, controller 120, and core network 125. It is worth noting that terms like user equipment, mobile device, mobile station, access terminal, and others are used interchangeably herein and are not intended to imply a particular network topology or implementation. In some embodiments, controller 120 may be integrated into base stations 105.

The system 100 may support operation on multiple carriers (waveform signals of different frequencies) and/or carrier aggregation. Multi-carrier transmitters can transmit modulated signals simultaneously on the multiple carriers. Each modulated signal may be sent on a different carrier and may carry pilot, overhead information, data, etc. The system 100 may include a multi-carrier LTE network capable of efficiently allocating network resources. The system 100 may also be configured to utilize multiple radio access technology or wireless communications technologies.

The base stations 105 can wirelessly communicate with the mobile devices 115 via a base station antenna. The base stations 105 may be configured to communicate with the mobile devices 115 under the control of the controller 120 via multiple carriers. Each of the base stations 105 can provide communication coverage for a respective geographic area, here the cells 110-*a*, 110-*b*, or 110-*c*. The system 100 may include base stations 105 of different types, e.g., macro, pico, and/or femto base stations. The base stations 105 may include Node B, Home Node B, eNode B, and/or Home eNode B base stations. The base stations 105 may also support different radio access technologies or wireless communications technologies including, but not limited to, WiMAX, CDMA 1x, LTE, and/or EVDO. In one embodiment, the base station 105 in cell 110-*a* may be configured as a WiMAX base station, the base station 105 in cell 110-*b* may be configured as a CDMA 1x base station, and/or the base station 105 in cell 110-*c* may be configured as an EVDO base station.

The mobile devices 115 can be dispersed throughout the cells 110. The mobile devices 115 may be referred to as mobile stations, mobile devices, user equipment, or subscriber units. The mobile devices 115 here include cellular phones and a wireless communications device, but can also include personal digital assistants (PDAs), other handheld devices, netbooks, notebook computers, etc. The mobile devices 115 may be configured as multi-mode mobile devices, where the mobile device 115 may be able to communicate utilizing different radio access technologies or wireless communications technologies including, but not limited to, WiMAX, CDMA 1x, LTE, and/or EVDO.

System 100 may be configured to determine a closest base station 105 to a respective mobile device 115. Embodiments may be configured where one of the base stations 105, the mobile device 115, the controller 120, and/or the core network may determine the closest base station 105 to the mobile device 115.

In some embodiments, multiple propagation delays with respect to a common reference time between the multi-mode mobile device 115 and each of multiple base stations 105 may be determined. Each of the multiple base stations 105 may be associated with a different wireless communications technology from multiple wireless communications technologies. In one example, the base station 105 in cell 110-*a* may be configured as a WiMAX base station, the base station 105 in cell 110-*b* may be configured as a CDMA 1x base station, and/or the base station 105 in cell 110-*c* may be configured as an EVDO base station. Other embodiments may utilize base stations that utilize additional forms of wireless communications technologies. The multiple propagation delays between the multi-mode mobile device 115 and the multiple base stations 105 associated with the different wireless communications technologies may be compared. A closest base station 105 to the multi-mode mobile device 115 from the multiple base stations 105 may be determined based on the comparison.

Position information regarding the identified closest base station 105 may be determined in some cases. The position information for the identified closest base station 105 from the multiple base stations 105 may be utilized as a position of the multi-mode mobile device 115. In some embodiments, a handover procedure of the multi-mode mobile device 115 to the closest base station 105 may be performed.

Figure 2:
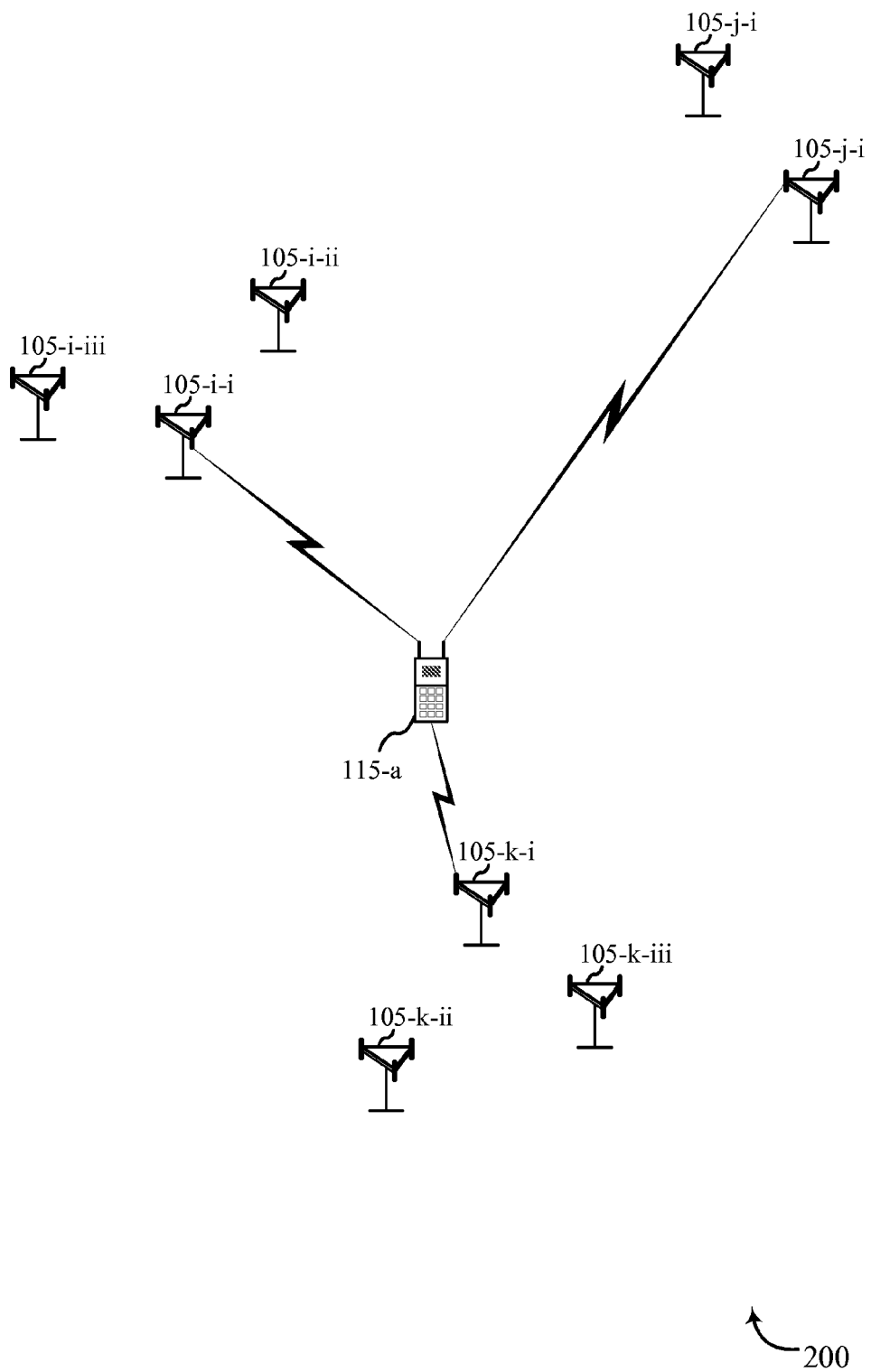
FIG. 2 is a block diagram illustrating a wireless communications system in accordance with various embodiments.

Referring first to FIG. 2, a block diagram illustrates an example of a wireless communications system 200 in accordance with various embodiments. System 200 may be an example of system 100. The system 200 includes base stations 105-*i*, 105-*j*, and 105-*k* and mobile device 115-*a* that is configured as a multi-mode mobile device. System 200 may be utilized to determine a closest base station 105 to mobile device 115-*a*.

In some embodiments, mobile device 115-*a* may determine multiple propagation delays with respect to a common reference time between the mobile device 115-*a* and base station 105-*i-i*, base station 105-*j-i*, and base station 105-*k-i*. In this example, base stations 105-*i* may utilize a first wireless communication technology, the base stations 105-*j* may utilize a second wireless communication technology, and the base stations 105-*k* may utilize a third wireless communication technology.

The multiple propagation delays between the mobile device 115-*a* and the multiple base stations 105-*i-i*, 105-*j-i*, and 105-*k-i* may be compared. A closest base station 105 to the mobile device 115-*a* from the multiple base stations 105-*i-i*, 105-*j-i*, and 105-*k-i* may be determined based on the comparison. In this example, base station 105-*k-i* is the closest base station to the mobile device 115-*a*.

In some embodiments, position information for the identified closest base station, base station 105-*k-i* in this example, may be determined. The position information for the identified closest base station 105-*k-i* from the multiple base stations 105-*i-i*, 105-*j-i*, and 105-*k-i* may be utilized as a position of the mobile device 115-*a*. In some embodiments, a handover procedure of the mobile device 115-*a* to the closest base station 105-*k-i* may be performed.

In some embodiments, a closest base station 105 to the mobile device 115-*a* may be determined for each wireless communication technology. For example, base stations 105-*i* may communicate utilizing a first wireless communication technology. Multiple propagation delays between the mobile device 115-*a* and the multiple base stations 105-*i* associated with the first wireless communication technology. The propagation delays between the mobile device 115-*a* and the multiple base stations 105-*i* associated with the first wireless communications technologies may be compared. A closest base station 105-*i-i* to mobile device 115-*a* from the multiple base stations 105-*i* may be determined based on comparing the multiple propagation delays between the mobile device 115-*a* and the multiple base stations 105-*i* associated with the first wireless communications technologies. The closest base station 105-*i-i* to the mobile device 115-*a* from the multiple base stations 105-*i* may be utilized as one of the base stations from the multiple base stations. Similar procedures may be done with respect to the other base stations 105-*j* and 105-*k* associated with other wireless communications technologies to determine a closest base station 105-*j-i* and 105-*k-i* to the mobile device 115-*a* with respect to each group of base stations 105, where each group is associated with a different wireless communication technology. These closest base stations 105-*i-i*, 105-*j-i*, and 105-*k-i* may then be utilized to determine a closest base station amongst the multiple wireless access technology groups.

FIG. 3A shows a timing diagram 300-*a* for determining the multiple propagation delays in a multi-wireless communications system (e.g., a multi-Radio Access Technology (RAT) system. System 100 and/or 200 may determine multiple propagation delays using timing diagram 300-*a*. Diagram 300-*a* shows a system that includes at least three different RATS, designated as RAT i, RAT j, and RAT k, and respective transmissions that may be received, such as at a mobile device 115 of FIG. 1 and/or mobile device 115-*a* of FIG. 2. Multiple event markers 310-*i*, 310-*j*, and 310-*k* may be determined. Each event marker 310 may represent an event associated with a transmission from a respective base station 105 from the multiple base stations where each base station utilizes a different RAT. Multiple receive times r(i), r(j), and r(k) may be determined. In some cases, time differences (e.g., d(i), d(j), and d(k)) may be determined, where time difference may reflect the difference between a receive time and a common reference time, such as a receive time of one of the designated Radio Access Technologies. In this example, RAT i may be considered the designed Radio Access Technology. Each receive time r(i), r(j), and r(k) may be associated with a respective event marker 310-*i*, 310-*j*, and 310-*k*. Multiple transmission times t(i), t(j), and t(k) may be determined. Each transmission time t(i), t(j), and t(k) may be associated with a respective event marker 310-*i*, 310-*j*, and 310-*k*. Each respective propagation delay may be determined utilizing the respective receive time r and the respective transmission time t for each respective base station from the multiple base stations. In this example, the propagation delays may be related to t(i), t(j)-d(j), and t(k)-d(k). Other embodiments may utilize more or less RATs and may adapt the method in different ways.

Each respective transmission time, such as t(i), t(j), and t(k), may include a respective GPS time. Each respective receive time, such as r(i), r(j), and r(k), may include a time difference with respect to a first receive time from multiple receive times; this may be represented as d(i), d(j), and d(k) as discussed above. The first receive time may be the common reference time. The multiple event markers may include at least a frame boundary, a frame tick, or a control channel cycle boundary. The multiple RATS may include at least two of WiMAX, CDMA 1x, LTE, or EVDO.

In some embodiments, a mobile device, such as mobile device 115 of FIG. 1 and/or mobile device 115-a of FIG. 2, may determine the propagation delays. In some embodiments, a base station 105 such as seen in FIG. 1 and/or FIG. 2 may determine the propagation delays. The core network 125 and/or the controller 120 may determine the propagation delays in other embodiments. In some cases, the mobile device 115 may determine some information, such as receive times r, transmission times t, and/or time differences d, which it may then transmit to the other devices or systems, such as one or more base stations 105, the controller 120, and/or the core network 125, where this information may be utilized to determine the propagation delays.

Figure 3B:
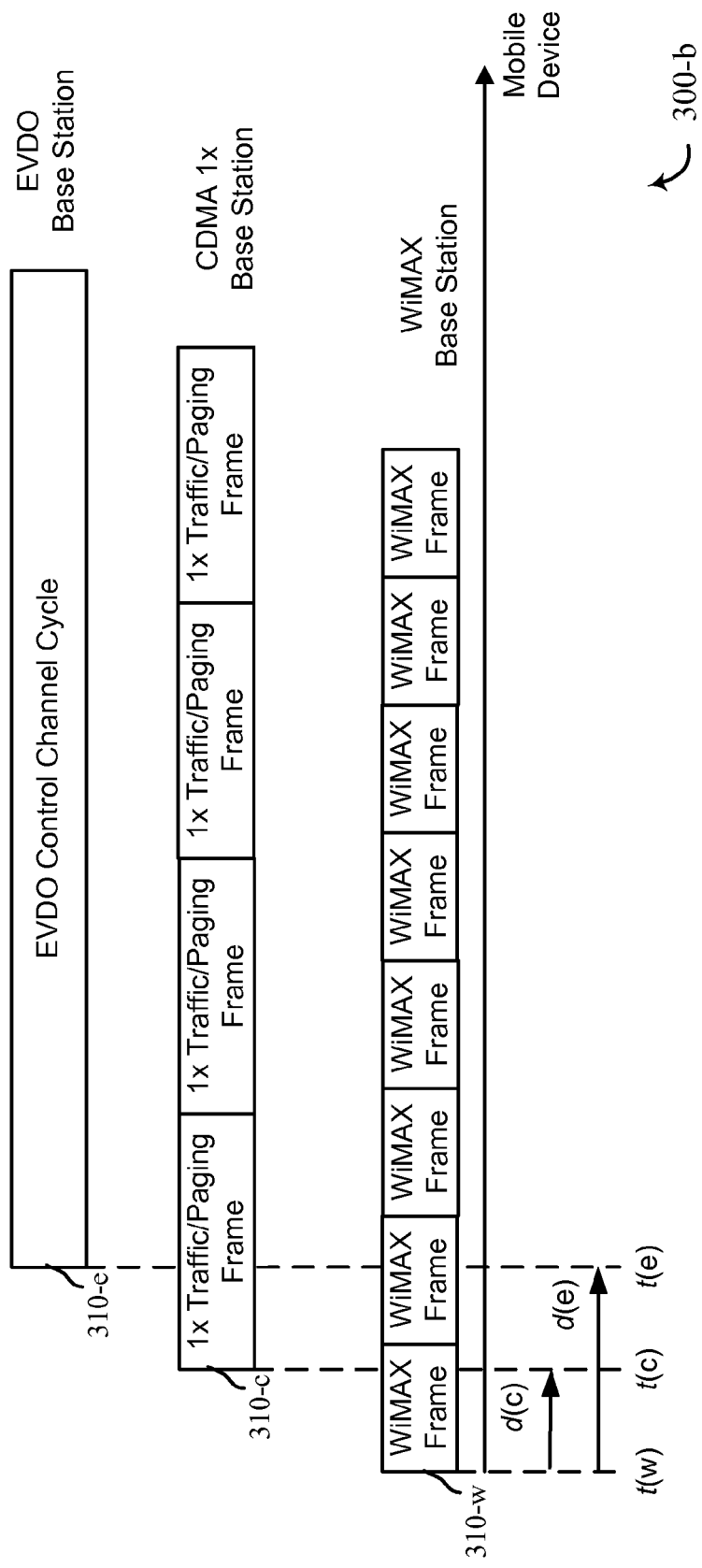

FIG. 3B shows a specific example a timing diagram 300-b for determining a closest base station to a mobile device among multiple radio access technologies. Timing diagram 300-b may be an example of timing diagram 300-a of FIG. 3A. In this example, the base stations may include a WiMAX base station, a CDMA 1x base station, and an EVDO base station, denoted by the indices as w, c, e, respectively. Other embodiments may utilize base stations that utilize different Radio Access Technologies. A closest base station may be determined from these three Radio Access Technologies.

For example, a WiMAX frame boundary 310-w may be utilized as a reference point. A WiMAX frame and its starting time of the frame may be used as a time reference. A time difference between the next 20 ms frame 310-w tick in CDMA 1x relative to this particular WiMAX frame boundary 310-w, denoted by d(c), may be determined Note that d(c) is positive if CDMA 1x is later than the WiMAX. A time difference between the next control channel cycle boundary (starting from a EVDO slot boundary 310-e) relative to this particular WiMAX frame boundary 310-w, denoted by d(e), may also be determined Note that d(e) is positive if it is later than the WiMAX.

In addition, corresponding GPS times of the events may also be determined These may be denoted by:

$t(w)$;

$t(c)$=the CDMA 1x system time (in units of 20 ms)*20 ms; and $t(e)$=the CDMA EVDO system time (in units of 5/3 ms EVDO slot)*5/3 ms.

Note that both the CDMA 1x system and the EVDO system time may start from Jan. 6, 1980, 12:00 AM GMT, the same GPS time, but with different units.

With respect to the WiMAX system, the 22 bits of GPS time in units of frame duration may only be know in some cases. Therefore, t(w) may be recovered in different ways including the following. A frame number N of the WiMAX reference frame may be determined. A formula of different GPS times indexed by j such as the following may be utilized:

$u(i)$=(GPS time in units of frame duration+$i*2^{22}$)
*Frame_Duration−GPS frame transmission time offset/2 ns An index k may be chosen that can get u(k) closest to t(c) (or t(e)), i.e. |u(k)−t(c)|<|u(i)−t(c)|, i≠k (or |u(k)−t(e)|<|u(i)−t(e)|, i≠k). Then, t(w) can be set equal to u(k).

The closest base station to the mobile device may then be chosen by the largest values among {t(w), t(c)−d(c), t(e)−d(e)}. In this example, the smaller the propagation delay, the larger the GPS transmission time stamp and the smaller receive time difference. In some embodiments, the location of the closest base station may be utilized for different purposes, such as estimate a position of the mobile device. The base stations location may be indicated by LBS-ADV or SPM in some cases.

Figure 4A:
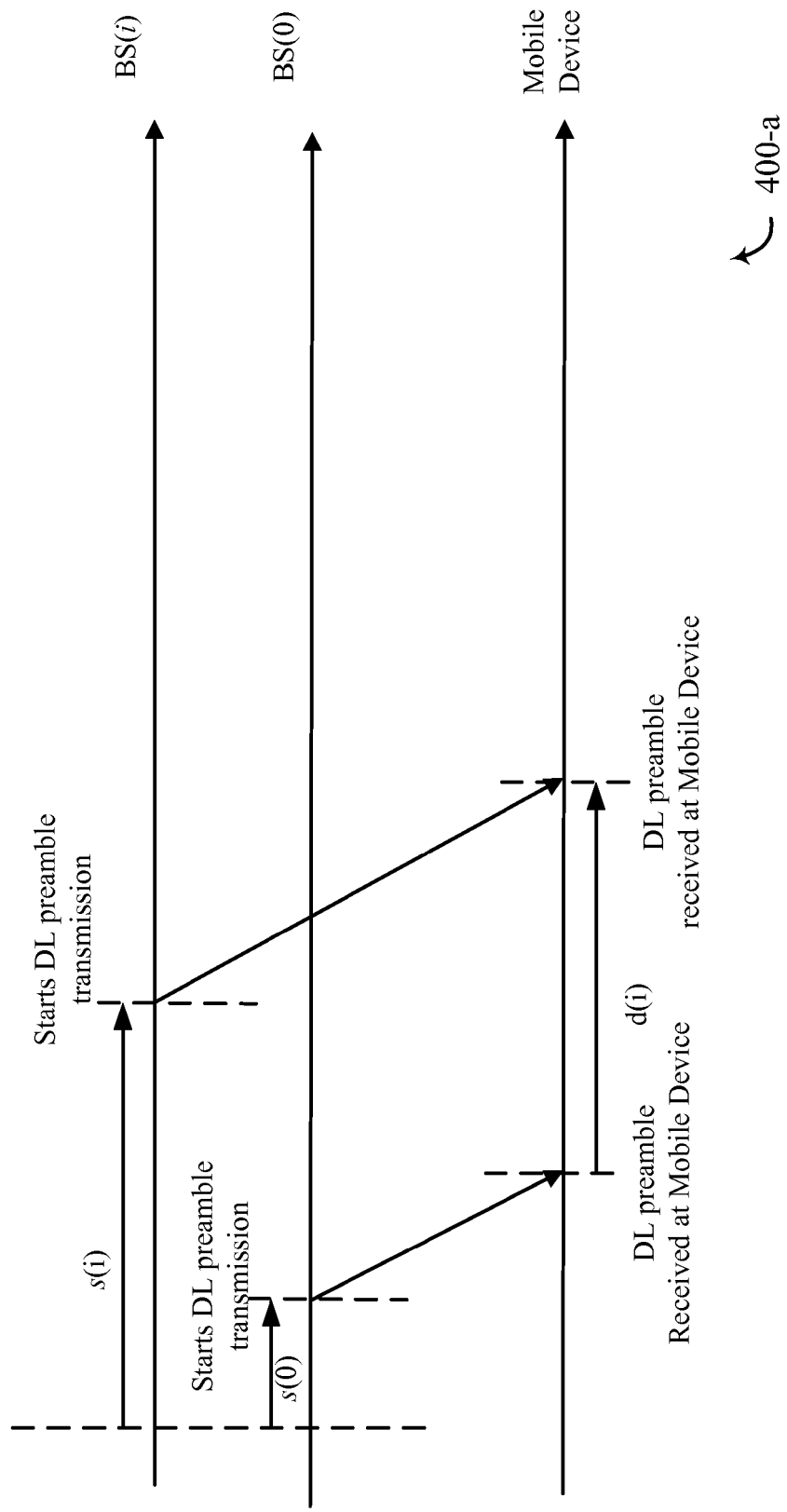
FIG. 4A illustrates a timing diagram that may be utilized to determine propagation delays within a WiMAX system in accordance with various embodiments.

In some embodiments, the closest base station to the mobile device may be determined with respect to each wireless communications technology group. The following provides several examples of how this may be done with different wireless technologies, though these methods may be adapted to other wireless technologies For example, FIG. 4A shows an example of a timing diagram 400-a where a closest base station within a WiMAX system may be determined. The WiMAX system may be a time synchronous system. For example, in Section 8.4.10.1 of IEEE 802.16 Rev2/D8, it is recommended that the WiMAX base stations be synchronized to a GPS receiver and transmitting the frames may be synchronized to GPS second. The following procedure may be utilized in some embodiments.

There may be non-zero frame transmission time offset as indicated in LBS-ADV that may be adjusted. A WiMAX base station may be chosen as a reference base station, BS(0). The mobile device may choose the reference BS(0), though in some embodiments, a base station or core network device or system may determine the reference BS(0). The starting time of the frame of a few other base stations denoted by BS(i), i≠0, may be compared. The starting frame can be measured by the preamble. Frames from different base stations near each other may be measured and compared in the time domain. A time difference of starting downlink frame may be represented as d(i) for BS(i) where d(i)>0 means later than the reference base station. It may be assumed d(0)=0. In addition, the frame transmission time offset of base stations as indicated by LBS-ADV may be denoted by s(i).

A closest WiMAX base station to a mobile device may be determined with the largest value (s(i)-d(i)). The variable d(i) can indicate the delay (less positive means less propagation delay) from a reference base station and it may be added by s(i) (more positive means late transmission and less propagation delay) to adjust late transmission.

Figure 4B:
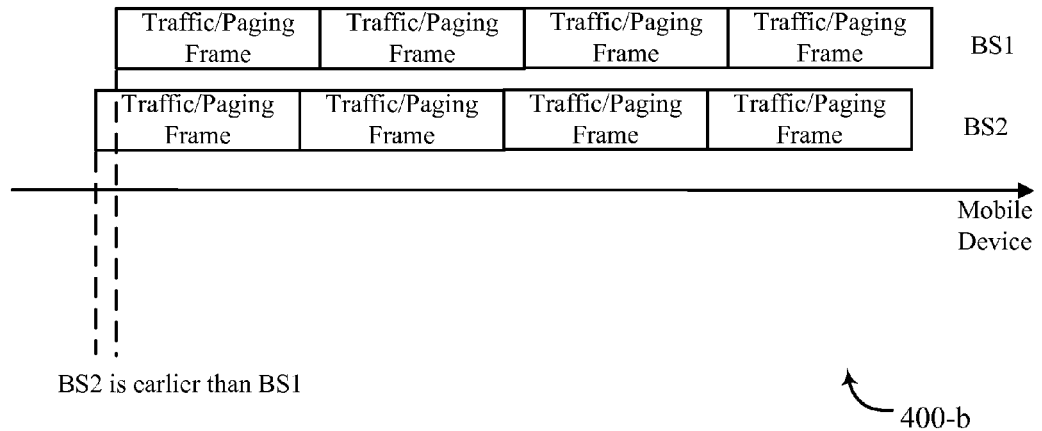
FIG. 4B illustrates a timing diagram that may be utilized to determine propagation delays within a CDMA 1x system in accordance with various embodiments.

FIG. 4B shows an example of a timing diagram 400-b where the closest base station within a CDMA 1x system may be determined with respect to the mobile device. CDMA 1x is known to be time synchronous. The start of either the 20 ms traffic or 80 ms paging frame ticks may be used as the events that may be compared to determine which base station is closest to the mobile device. For example, the base station with the earliest tick is generally the closest CDMA 1x base station to the mobile device.

Figure 4C:
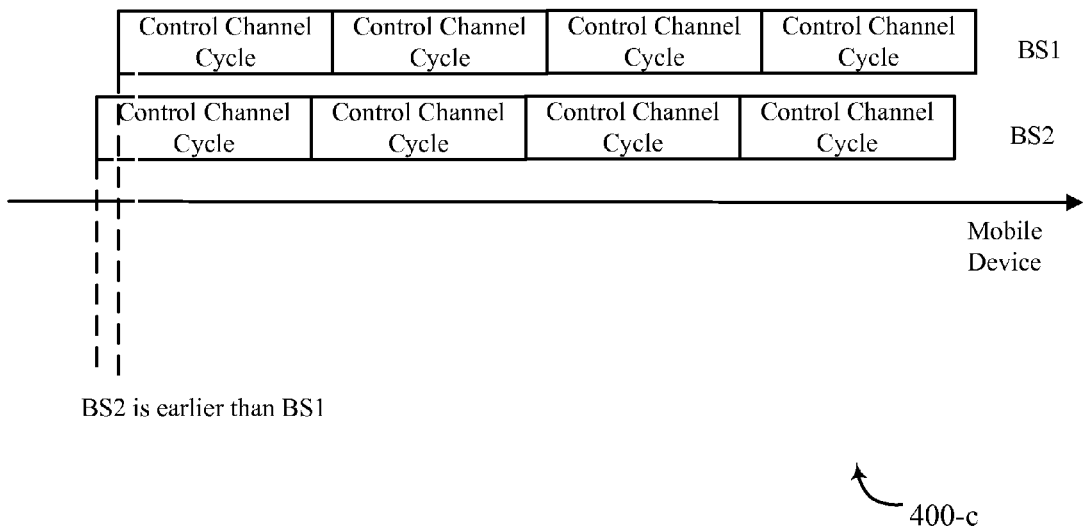
FIG. 4C illustrates a timing diagram that may be utilized to determine propagation delays within an EVDO system in accordance with various embodiments.

FIG. 4C shows an example of a timing diagram 400-c where the closest base station within a CDMA EVDO system may be determined with respect to a mobile device. CDMA EVDO is known to be time synchronous. The downlink 426.67 ms control channel cycle (CCC) boundary may be measured and compared for multiple base stations to determine which has the earliest CCC boundary. The base station with the earliest CCC boundary is the closest CDMA EVDO base station to the mobile device.

Some embodiments may utilize position information of one or more base stations. For example, position information with regard to a closest identified base station to a mobile device amongst multiple wireless communications technologies may be utilized as an estimated position of the mobile device. A mobile device may thus estimate its location by using the location of a nearby base station location. This can be useful when other accurate methods are not available (e.g., GPS and network based trilateration). Alternatively, a rough estimation to use nearby base station location as mobile device location can reduce the latency to get the mobile device location.

In WiMAX systems, for example, the location of nearby base stations can be indicated in the Location Based Service Advertisement (LBS-ADV) message received by mobile devices. The LBS-ADV message can include the location of the serving base station and the neighbor BSs. In addition, LBS-ADV message can include the GPS Time TLV with the following information according to the IEEE802.16 Rev2/D8 standards: GPS time in units of frame duration (22 bits); and/or GPS frame transmission time offset (10 bits), in units of 2 ns. GPS time in units of frame duration can indicate GPS time in frame number when the base station starts to transmit the frame number=0 and it may be calculated by:

$$\text{GPS time in units of frame duration}=\text{FLOOR}\{t0/\text{Frame\_Duration}+0.5\} \bmod 2^{22}.$$

The variable t0 is the GPS time to transmit the frame number=0. Note that the GPS time starts from Jan. 6, 1980, 12:00 AM GMT.

GPS frame transmission time offset may be represented as the time difference between GPS time in units of frame duration and actual time to start transmitting frame number (negative means late transmission). For example, $$\text{GPS frame transmission time offset}=[\text{FLOOR}\{t0/\text{Frame\_Duration}+0.5\}*\text{Frame\_Duration}-t0\}]/2 \text{ ns}.$$

Figure 4D:
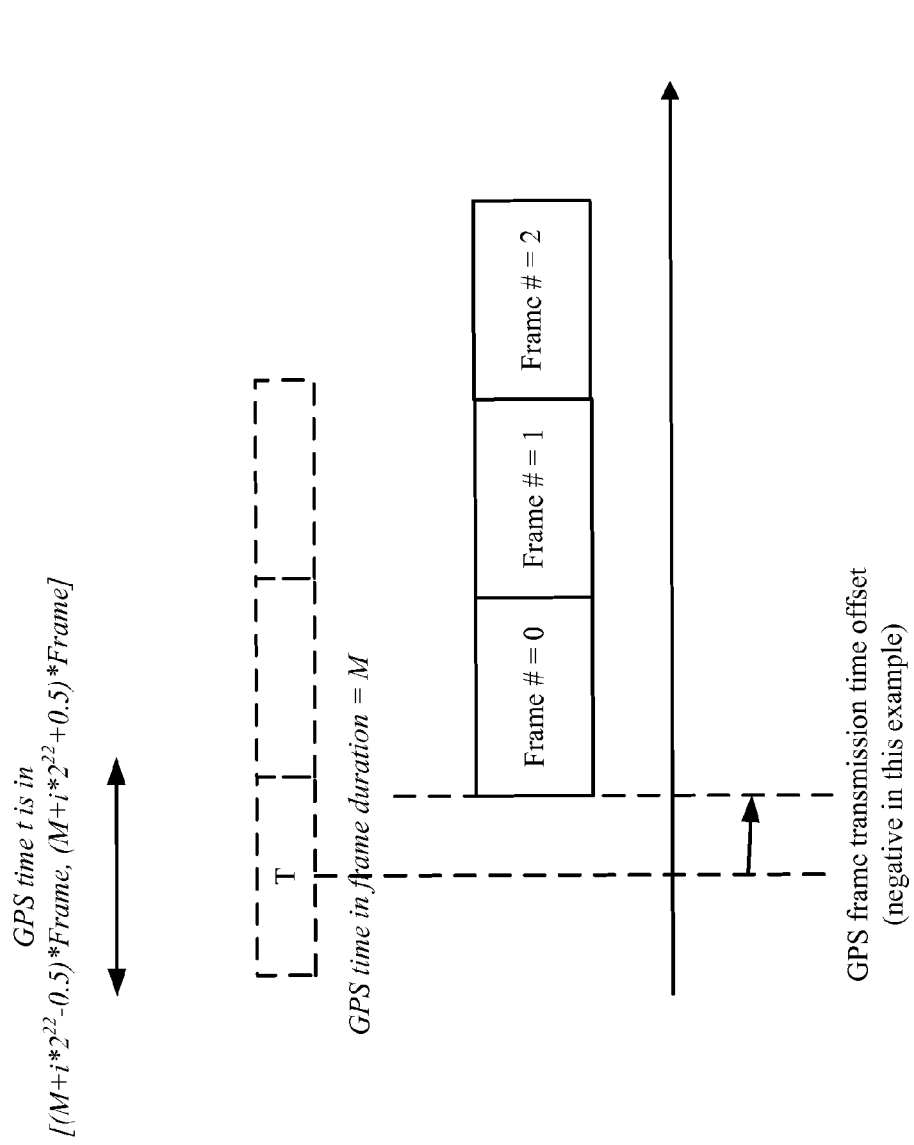
FIG. 4D illustrates a timing diagram that may be utilized to determine GPS transmission times within a WiMAX system in accordance with various embodiments.

FIG. 4D shows a time diagram 400-d that shows this concept. The location can be in absolute position, i.e. latitude (in degree), longitude (in degree), and/or altitude (in meter). The location can be in relative position, i.e. distance north of the reference point (in meter), distance east of the reference point (in degree), and/or distance above the reference point (in meter).

In CDMA 1x system, the location of the serving BS can be sent in the System Parameters Message (SPM) by the serving BS. The location may be an absolute position, i.e. latitude (in ¼ seconds), longitude (in ¼ seconds). Also, in CDMA EVDO system, the location of the serving BS can be sent in the Sector Parameters Message (SPM) by the serving BS. The location may be absolute position, i.e. latitude (in ¼ seconds), longitude (in ¼ seconds).

Some embodiments may utilize the above-described location information regarding different base stations that may utilize different wireless communications technologies. For example, if it is determined that a closest base station to a mobile device is a base station associated with a specific wireless communication technology, the mobile device, the closest base station, and/or other devices may utilize information related to determining, transmitting, and/or receiving the location information in accordance with various embodiments.

Figure 5:
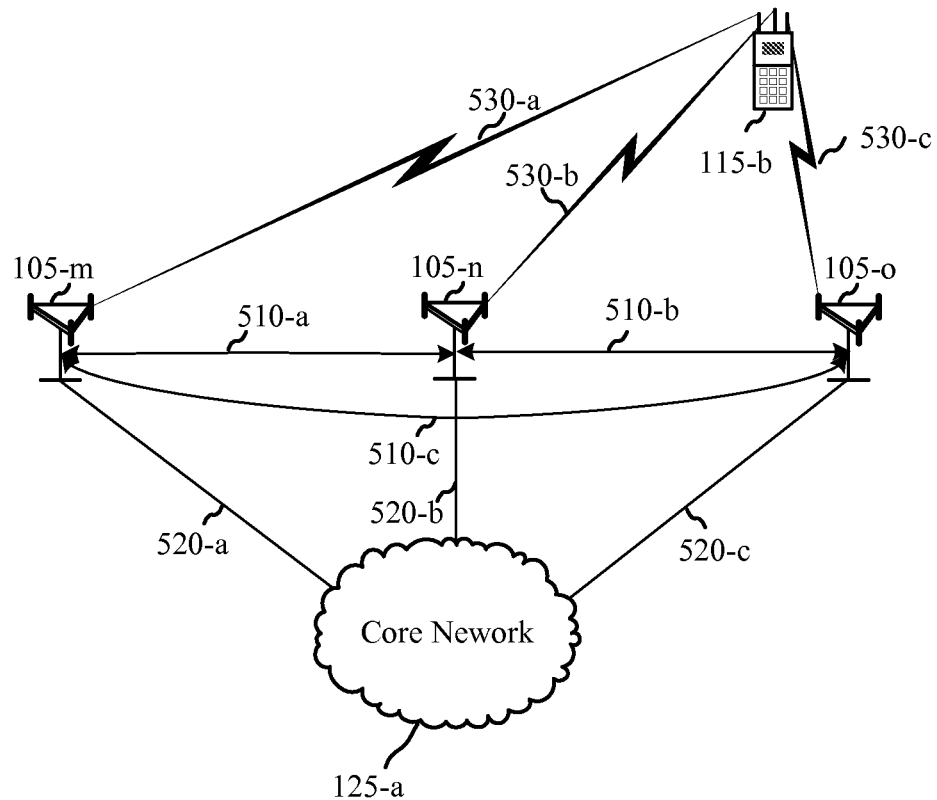
FIG. 5 illustrates a block diagram illustrating a wireless communications system in accordance with various embodiments.

Referring to FIG. 5, a block diagram illustrates an example of a wireless communications system 500 configured to determine a closest base station to a mobile device in accordance with various embodiments. System 500 may be an example of system 100 and/or 200. The system 500 includes base stations 105-*m*, 105-*n*, and 105-*o* and mobile device 115-*b* that is configured as multi-mode mobile device. System 500 may be utilized to determine a closest base station 105 to mobile device 115-*b*. Other embodiments may include more or less base stations 105 and/or mobile device 115-*b*. Each base station 105 may be associated with a different wireless communications technology and may communicate with the mobile device 115-*b* through respective communications links 530-*a*, 530-*b*, and/or 530-*c*.

System 500 also shows several possible communications connections between the base stations 105 and/or the core network 125-*a*. For example, base station 105-*m* may communicate with base station 105-*n* through communications connection 510-*a* and/or with base station 105-*o* through communications connection 510-*c*. Similarly, base station 105-*n* may communicate with base station 105-*o* through communications connection 510-*b*. In some embodiments, one or more of these communications connections 510 between base stations may be configured as an X2 interface utilized by some LTE wireless communications technologies.

System 500 also shows communications connections between the base stations 105 and the core network 125-*a*, shown as communications connections 520-*a*, 520-*b*, and/or 520-*c*. In some embodiments, base stations 105 may communicate with each other through the core network 125-*a* using the communications connections 520. In some embodiments, one or more of these communications connections 520 between base stations 105 and the core network 125-*a* may be configured as an S1 interface utilized by some LTE wireless communications technologies.

Communications connections and/or links 510, 520, and/or 530 may be utilized in different embodiments to transmit information between the mobile device 115-*b*, the base stations 105, and/or the core network such that these different devices and or systems may determine multiple propagation delays with respect to a common reference time between the mobile device 115-*b* and base station 105-*m* base station 105-*n*, and base station 105-*n*. For example, in some embodiments, one or more the base stations 105 and/or core network 125-*a* may determine the propagation delays. The one or more the base stations 105 and/or core network 125-*a* may also compare the determine propagation delays and/or identify the closest base station 105 to the mobile device 115-*b*. For example, in some embodiments, the mobile device 115-*b* may transmit over one or more the communications links 530 information regarding receive times, transmission times, and/or event markers to one or more of the base stations 105. In some cases, the base stations may then transmit this information between each other through connections 510 or through the core network 125-*a* utilizing connections 520.

In some embodiments, position information for the identified closest base station, which may be base station 105-*o* in this example, may be determined. The position information for the identified closest base station 105-*o* may be utilized as a position of the mobile device 115-*b*. This position information that may be utilized as position of the mobile device 115-*b* may also be transmitted over connections such as 510 and/or 520 such that the other base stations 105, the core network 125-*a*, and/or other mobile devices 115 (not shown) may utilize the position information regarding the mobile device 115-*b*. In some embodiments, a handover procedure of the mobile device 115-*b* to the closest base station 105-*o* may be performed.

Figure 6:
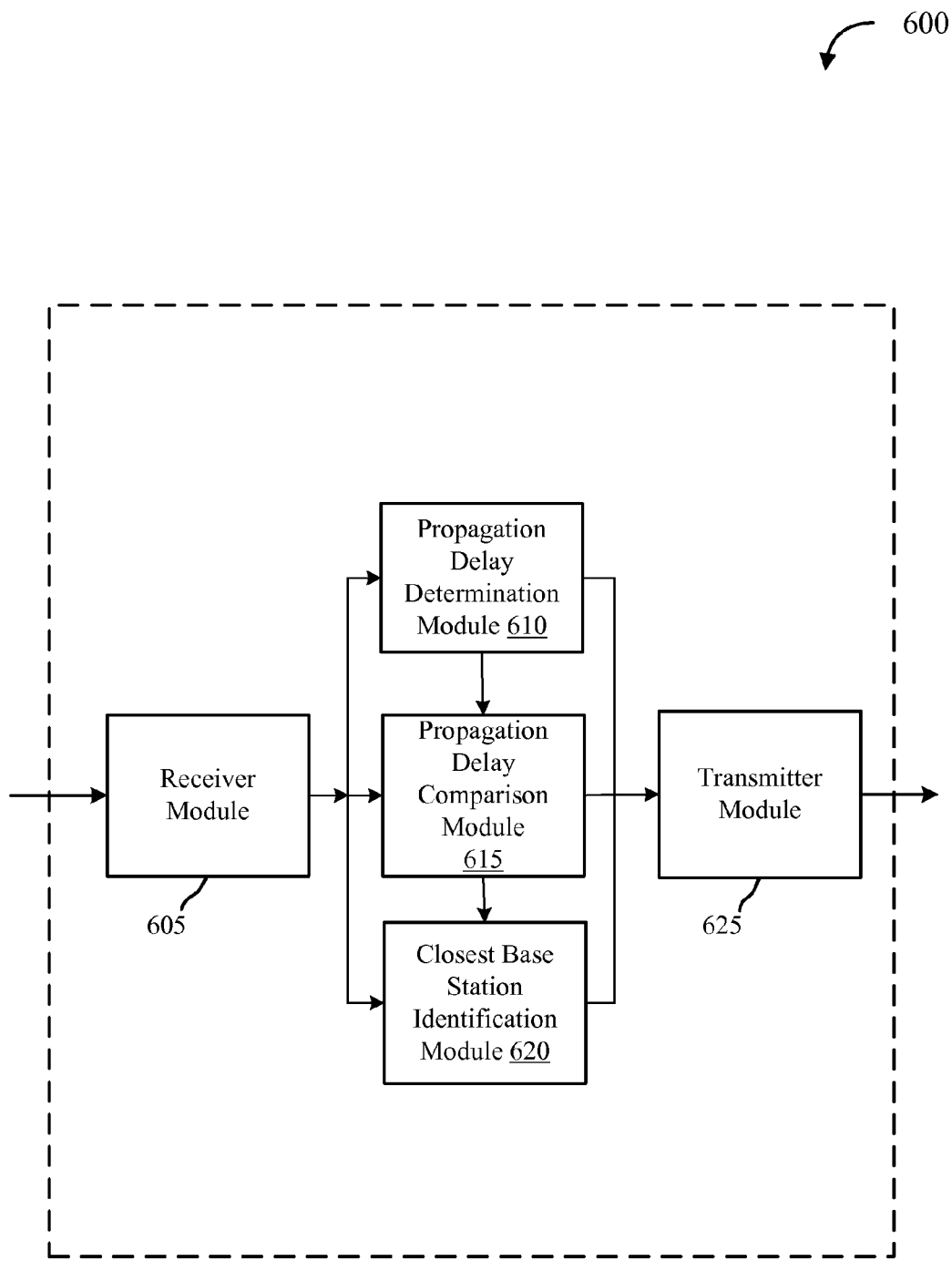
FIG. 6 illustrates a block diagram of a wireless communications device configured to determine a closest base station to a mobile device in accordance with various embodiments.

Turning next to FIG. 6, a block diagram illustrates a wireless communications device 600 configured to determine a closest base station to a mobile device in accordance with various embodiments. Device 600 may also be referred to as an apparatus in some embodiments. In some embodiments, the device 600 may be a mobile device 115 as seen in FIG. 1, FIG. 2, and/or FIG. 5. In some embodiments, the device 600 may be a base station 105 as seen in FIG. 1, FIG. 2, and/or FIG. 5. In some embodiments, the device 600 may be a core network 125 or controller 120 as seen in FIG. 1, FIG. 2, and/or FIG. 5. The device 600 may also be a processor. The device 600 may include a receiver module 605, a propagation delay determination module 610, a propagation delay comparison module 615, a closest base station identification module 620, and/or a transmitter module 625. Each of these components may be in communication with each other.

These components of the device 600 may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 605 may receive information from difference sources over different channels and deliver to other modules of device 600. The transmitter module 625 may transmit information it may receive form the other modules of device 600.

Receiver module 605 may receive information that it passes to the propagation delay determination module 610 where multiple propagation delays with respect to a common reference time between the multi-mode mobile device and each of multiple base stations may be determined. Each of the multiple base stations may be associated with a different wireless communications technology from multiple wireless communications technologies. For example, the multiple wireless communications technologies may include at least two of WiMAX, CDMA 1x, LTE, or EVDO. The multiple wireless communications technologies may include multiple Radio Access Technologies (RAT). The propagation delay comparison module 615 may then compare the multiple propagation delays between the multi-mode mobile device and the multiple first base stations associated with the different wireless communications technologies. The closest base station identification module 620 may then determine a closest base station to the multi-mode mobile device from the multiple first base stations based on the comparison.

In some embodiments, the propagation delay determination module 610 may determine multiple event markers. Each event marker may represent an event associated with a transmission from a respective base station from the multiple base stations. The event markers may include at a frame boundary, a frame tick, and/or a control channel cycle boundary, for example. The propagation delay determination module 610 may also have multiple receive times. Each receive time may be associated with a respective event marker. The propagation delay determination module 610 may also determine multiple transmission times. Each transmission time may be associated with a respective event. The propagation delay determination module 610 may then determine each respective propagation delay utilizing the respective receive time and the respective transmission time for each respective base station from the multiple base stations. Each respective transmission time may include a respective GPS time. Each respective receive time may include a time difference with respect to a first receive time from multiple receive times. The first receive time may be the common reference time.

In some embodiments, the propagation delay determination module 610 may determine multiple propagation delays between the multi-mode mobile device and multiple base stations that all utilize the same wireless communications technology or RAT. Each base station of these multiple base stations may be associated with a wireless communications technology from the multiple wireless communications technologies. The propagation delay comparison module 615 may compare the propagation delays between the multi-mode mobile device and the multiple base stations associated with the same wireless communications technologies. The closest base station identification module 620 may then determine a closest base station to the multi-mode mobile device from the multiple base stations associated with the same wireless communications technology based on comparing the multiple propagation delays between the multi-mode mobile device and the multiple base stations associated with the same wireless communications technologies. The closest base station to the multi-mode mobile device from these multiple base stations associated with the same wireless communications technology may be utilized as one of the base stations from the multiple base stations among multiple different wireless communications technologies.

Figure 7:
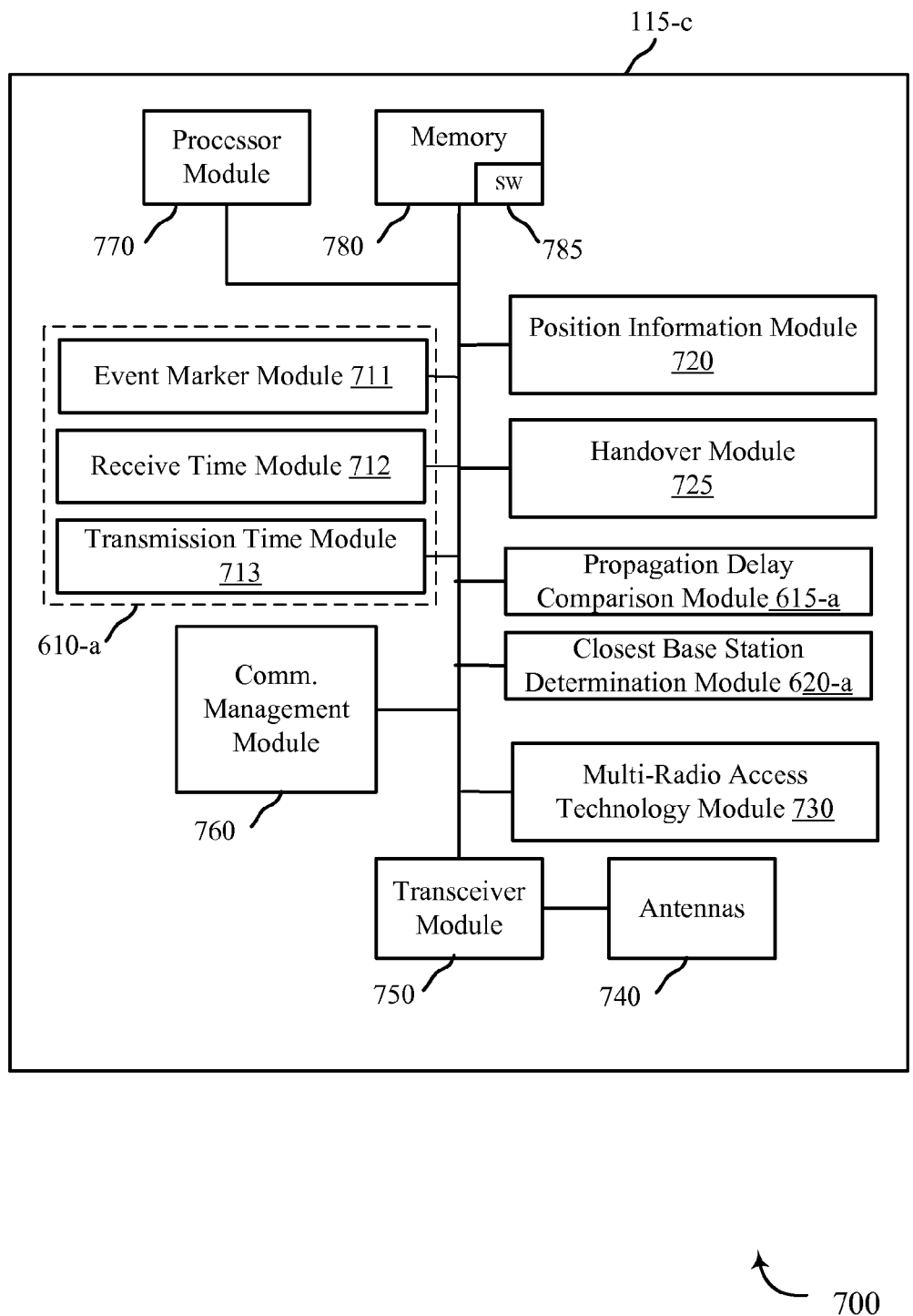
FIG. 7 illustrates a block diagram of a multi-mode mobile device configured to determine a closest base station to a mobile device in accordance with various embodiments.

FIG. 7 is a block diagram 700 of a mobile device 115-*c* configured to determine a closest base station to the mobile device in accordance with various embodiments. The mobile device 115-*c* may have any of various configurations, such as personal computers (e.g., laptop computers, netbook computers, tablet computers, etc.), cellular telephones, PDAs, digital video recorders (DVRs), internet appliances, gaming consoles, e-readers, etc. The mobile device 115-*c* may have an internal power supply (not shown), such as a small battery, to facilitate mobile operation. In some embodiments, the mobile device 115-*c* may be a mobile device 115 of FIG. 1, FIG. 2, and/or FIG. 5. The mobile device 115-*c* may be a multi-mode mobile device. The mobile device 115-*c* may be referred to as a wireless communications device in some cases.

The mobile device 115-*c* may include antennas 740, a transceiver module 750, memory 780, and a processor module 770, which each may be in communication, directly or indirectly, with each other (e.g., via one or more buses). The transceiver module 750 is configured to communicate bi-directionally, via the antennas 740 and/or one or more wired or wireless links, with one or more networks, as described above. For example, the transceiver module 750 may be configured to communicate bi-directionally with base stations 105 of FIG. 1, FIG. 2, and/or FIG. 5. The transceiver module 750 may include a modem configured to modulate the packets and provide the modulated packets to the antennas 740 for transmission, and to demodulate packets received from the antennas 740. While the mobile device 115-*c* may include a single antenna, the mobile device 115-*b* will typically include multiple antennas 740 for multiple links.

The memory 780 may include random access memory (RAM) and read-only memory (ROM). The memory 780 may store computer-readable, computer-executable software code 785 containing instructions that are configured to, when executed, cause the processor module 770 to perform various functions described herein (e.g., call processing, database management, message routing, etc.). Alternatively, the software 785 may not be directly executable by the processor module 770 but be configured to cause the computer (e.g., when compiled and executed) to perform functions described herein.

The processor module 770 may include an intelligent hardware device, e.g., a central processing unit (CPU) such as those made by Intel® Corporation or AMD®, a microcontroller, an application specific integrated circuit (ASIC), etc. The processor module 770 may include a speech encoder (not shown) configured to receive audio via a microphone, convert the audio into packets (e.g., 30 ms in length) representative of the received audio, provide the audio packets to the transceiver module 750, and provide indications of whether a user is speaking. Alternatively, an encoder may only provide packets to the transceiver module 750, with the provision or withholding/suppression of the packet itself providing the indication of whether a user is speaking.

According to the architecture of FIG. 7, the mobile device 115-c may further include a communications management module 760. The communications management module 760 may manage communications with other mobile device 115. By way of example, the communications management module 760 may be a component of the mobile device 115-c in communication with some or all of the other components of the mobile device 115-c via a bus. Alternatively, functionality of the communications management module 760 may be implemented as a component of the transceiver module 750, as a computer program product, and/or as one or more controller elements of the processor module 770.

The components for mobile device 115-c may be configured to implement aspects discussed above with respect to device 600 in FIG. 6 and may not be repeated here for the sake of brevity. For example, the propagation delay comparison module 615-a may be the propagation delay comparison module 615 of FIG. 6. The closest base station determination module 620-a may be an example of the closest base station determination module 620 of FIG. 6. The event marker module 611, the receive time module 612, and/or the transmission time module 613 may provide specific functionality individually or in combination for propagation delay determination module 610-a that may be an example of propagation delay determination module 610 of FIG. 6.

The mobile device 115-c may also include a position information module 720, a handover module 725, and/or a multi-Radio Access Technology module. In some embodiments, the position information module 720 may determine position information for base stations, such as the identified closest base station. The position information module 720 may also store positions that may be utilized as position information for the mobile device 115-c. For example, the mobile device 115-c may utilize the position information for the identified closest base station from the multiple first base stations as a position of mobile device. The position information for the identified closest base station may include a GPS position of the identified closest base station. The mobile device 115-c may utilize the position information for the identified closest base station from the multiple first base stations as the multi-mode mobile device position through estimating the mobile device position based on the position information for the identified closest base station.

In some embodiments, the handover module 725 may be utilized to perform handover procedures of the mobile device 115-c from one base station to another. For example, the handover module 725 may perform a handover procedure of the mobile device 115-c to the closest base station that the closest base station determination module 620-a has identified.

The multi-Radio Access Technology module 730 may be utilized to facilitate communication between the mobile device 115-a and multiple base stations that utilize different Radio Access Technologies. For example, the multiple Radio Access Technologies may include, but are not limited to, WiMAX, CDMA 1x, LTE, or EVDO.

In some embodiments, the transceiver module 750 in conjunction with antennas 740 along with other possible components of mobile device 115-c may transmit information regarding the closest base station from the mobile device 115-c to base stations or a core network. In some embodiments, the transceiver module 750 in conjunction with antennas 740 along with other possible components of mobile device 115-c may transmit information, such as receive times and/or transmission times, to base stations or a core network such that these devices or systems may determine the multiple propagation delays, compare the multiple propagation delays, and/or identifying the closest base station to the mobile device 115-c. In some cases, the base station and/or core network may determine some of this propagation delay without having to receive it from the mobile device 115-a. For example, the base station and/or core network may be able to determine transmission times from other sources besides the mobile device 115-c.

Figure 8:
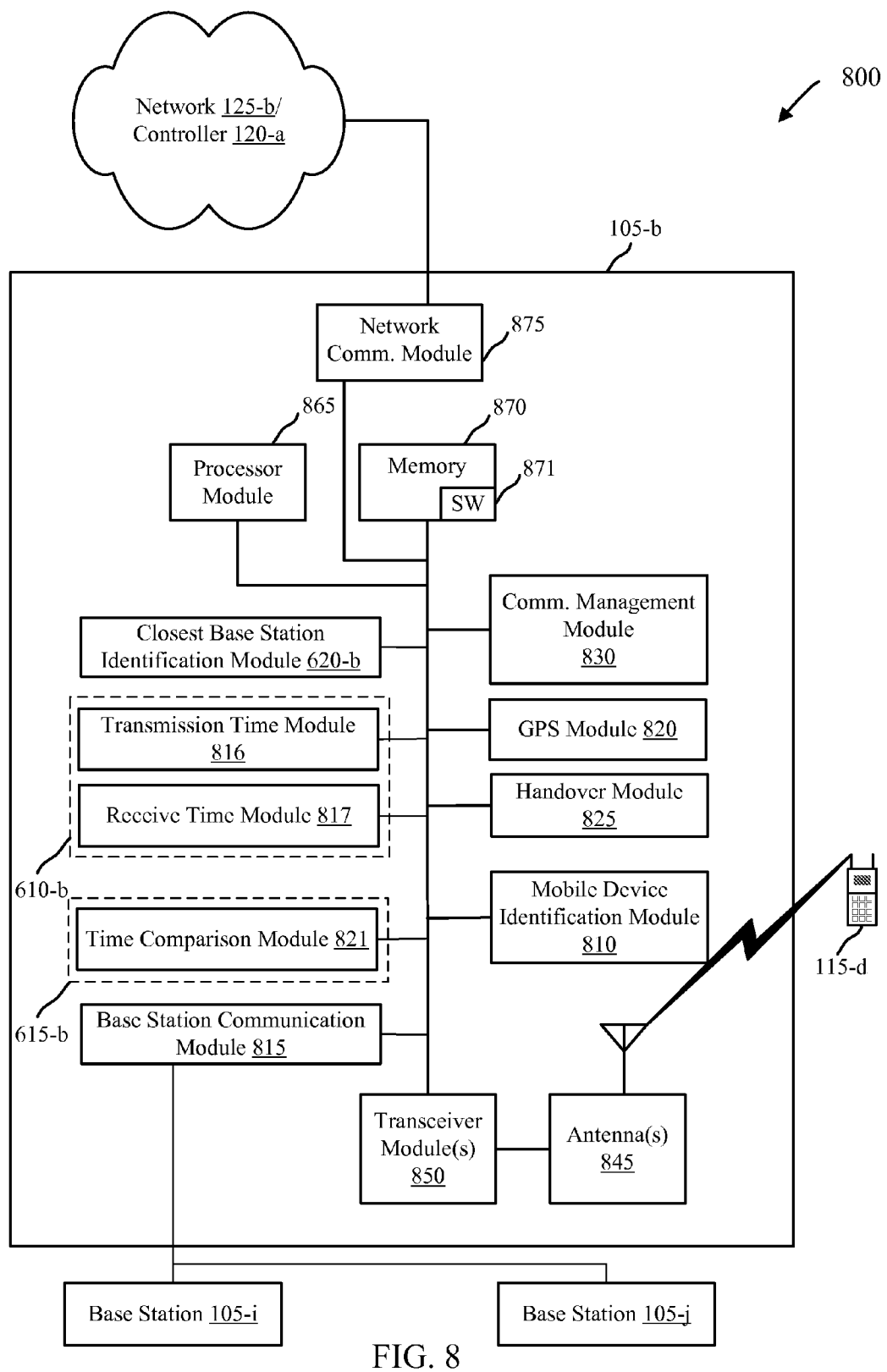
FIG. 8 illustrates a block diagram of a communications system configured for determining a closest base station to a multi-mode mobile device in accordance with various embodiments.

FIG. 8 shows a block diagram of a communications system 800 that may be configured for determining a closest base station to a multi-mode mobile device in accordance with various embodiments. This system 800 may be an example of aspects of the system 100 depicted in FIG. 1, system 200 of FIG. 2, and/or system 500 of FIG. 5, for example. The base station 105-b may include antennas 845, a transceiver module 850, memory 870, and a processor module 865, which each may be in communication, directly or indirectly, with each other (e.g., over one or more buses). The transceiver module 850 may be configured to communicate bi-directionally, via the antennas 845, with the mobile device 115-d, which may be a multi-mode mobile device. The transceiver module 850 (and/or other components of the base station 105-b) may also be configured to communicate bi-directionally with one or more networks. In some cases, the base station 105-b may communicate with the network 125-b and/or controller 120-a through network communications module 875. Base station 105-b may be an example of an eNodeB base station, a Home eNodeB base station, a NodeB base station, and/or a Home NodeB base station. Controller 120-a may be integrated into base station 105-b in some cases, such as with an eNodeB base station.

Base station 105-b may also communicate with other base stations 105, such as base station 105-i and base station 105-j. Each of the base stations may be communicate with mobile device 115-d using different wireless communications technologies, such as different Radio Access Technologies. In some cases, base station 105-b may communicate with other base stations such as 105-i and/or 105-j utilizing base station communication module 815. In some embodiments, base station communication module 815 may provide an X2 interface within an LTE wireless communication technology to provide communication between some of the base stations 105. In some embodiments, base station 105-b may communication with other base stations through controller 120-a and/or network 125-b. These different communications links between base stations may be utilized to transmit different information that the base station 105-b may utilize to determine propagation delay information with respect to the mobile device 115-d and multiple base stations 105 that communicate utilizing different wireless communications technologies.

The memory 870 may include random access memory (RAM) and read-only memory (ROM). The memory 870 may also store computer-readable, computer-executable software code 871 containing instructions that are configured to, when executed, cause the processor module 865 to perform various functions described herein (e.g., call processing, database management, message routing, etc.). Alternatively, the software 871 may not be directly executable by the processor module 865 but be configured to cause the computer, e.g., when compiled and executed, to perform functions described herein.

The processor module 865 may include an intelligent hardware device, e.g., a central processing unit (CPU) such as those made by Intel® Corporation or AMD®, a microcontroller, an application specific integrated circuit (ASIC), etc. The processor module 865 may include a speech encoder (not shown) configured to receive audio via a microphone, convert the audio into packets (e.g., 30 ms in length) representative of the received audio, provide the audio packets to the transceiver module 850, and provide indications of whether a user is speaking. Alternatively, an encoder may only provide packets to the transceiver module 850, with the provision or withholding/suppression of the packet itself providing the indication of whether a user is speaking.

The transceiver module 850 may include a modem configured to modulate the packets and provide the modulated packets to the antennas 845 for transmission, and to demodulate packets received from the antennas 845. While some examples of the base station 105-*b* may include a single antenna 845, the base station 105-*b* preferably includes multiple antennas 845 for multiple links which may support carrier aggregation. For example, one or more links may be used to support macro communications with mobile device 115-*d*.

According to the architecture of FIG. 8, the base station 105-*b* may further include a communications management module 830. The communications management module 830 may manage communications with other base stations 105. By way of example, the communications management module 830 may be a component of the base station 105-*b* in communication with some or all of the other components of the base station 105-*b* via a bus. Alternatively, functionality of the communications management module 830 may be implemented as a component of the transceiver module 850, as a computer program product, and/or as one or more controller elements of the processor module 865.

The components for mobile device base station 105-*b* may be configured to implement aspects discussed above with respect to device 600 in FIG. 6 and may not be repeated here for the sake of brevity. For example, the time comparison module 821 may provide specific functionality for the propagation delay comparison module 615-*a*, which may be an example of the propagation delay comparison module 615 of FIG. 6. The closest base station determination module 620-*b* may be an example of the closest base station determination module 620 of FIG. 6. The transmission time module 816 and/or the receive time module 817 may provide specific functionality individually or in combination for propagation delay determination module 610-*b* that may be an example of propagation delay determination module 610 of FIG. 6.

The base station 105-*b* may also include a GPS module 820, a handover module 825, and/or a mobile device identification module 810. In some embodiments, the GPS module 820 may provide GPS information regarding the location of the base station 105-*b*. In some cases, the GPS module 820 may be configured as a more general position information module that may determine position information for base station 105-*b* or other base stations 105, including an identified closest base station. The GPS module 820 may also store positions that may be utilized as position information for the mobile device 115-*d*. For example, the base station 105-*b* may utilize the position information for the identified closest base station from the multiple base stations as a position of mobile device 115-*d*. The position information for the identified closest base station may include a GPS position of the identified closest base station. The GPS module 820 may utilize the position information for the identified closest base station from the multiple base stations 105 as the multi-mode mobile device position through estimating the mobile device position based on the position information for the identified closest base station.

In some embodiments, the handover module 825 may be utilized to perform handover procedures of the mobile device 115-*d* from one base station 105 to another. For example, the handover module 825 may perform a handover procedure of the mobile device 115-*d* to the closest base station that the closest base station determination module 620-*b* has identified.

In some embodiments, the transceiver module 850 in conjunction with antennas 845 along with other possible components of base station 105-*b* may transmit and/or receive information regarding the closest base station from the mobile device 115-*d* to base stations 105 and/or a network 125-*b*. In some embodiments, the transceiver module 850 in conjunction with antennas 845 along with other possible components of base station 105-*b* may transmit and/or receive information, such as receive times and/or transmission times, to other base stations 105-*i*, 105-*j*, the mobile device 115-*d*, and/or the network 125-*b* such that these devices or systems may determine the multiple propagation delays, compare the multiple propagation delays, and/or identify the closest base station to the mobile device 115-*d*. In some cases, the base station 105-*b*, the other base stations 105-*i*, 105-*j*, the controller 120-*a*, and/or network 125-*b* may determine some of this propagation delay information without having to receive it from the mobile device 115-*d*. For example, the base station 105-*b* may be able to determine transmission times from other sources besides the mobile device 115-*d*.

Figure 9A:
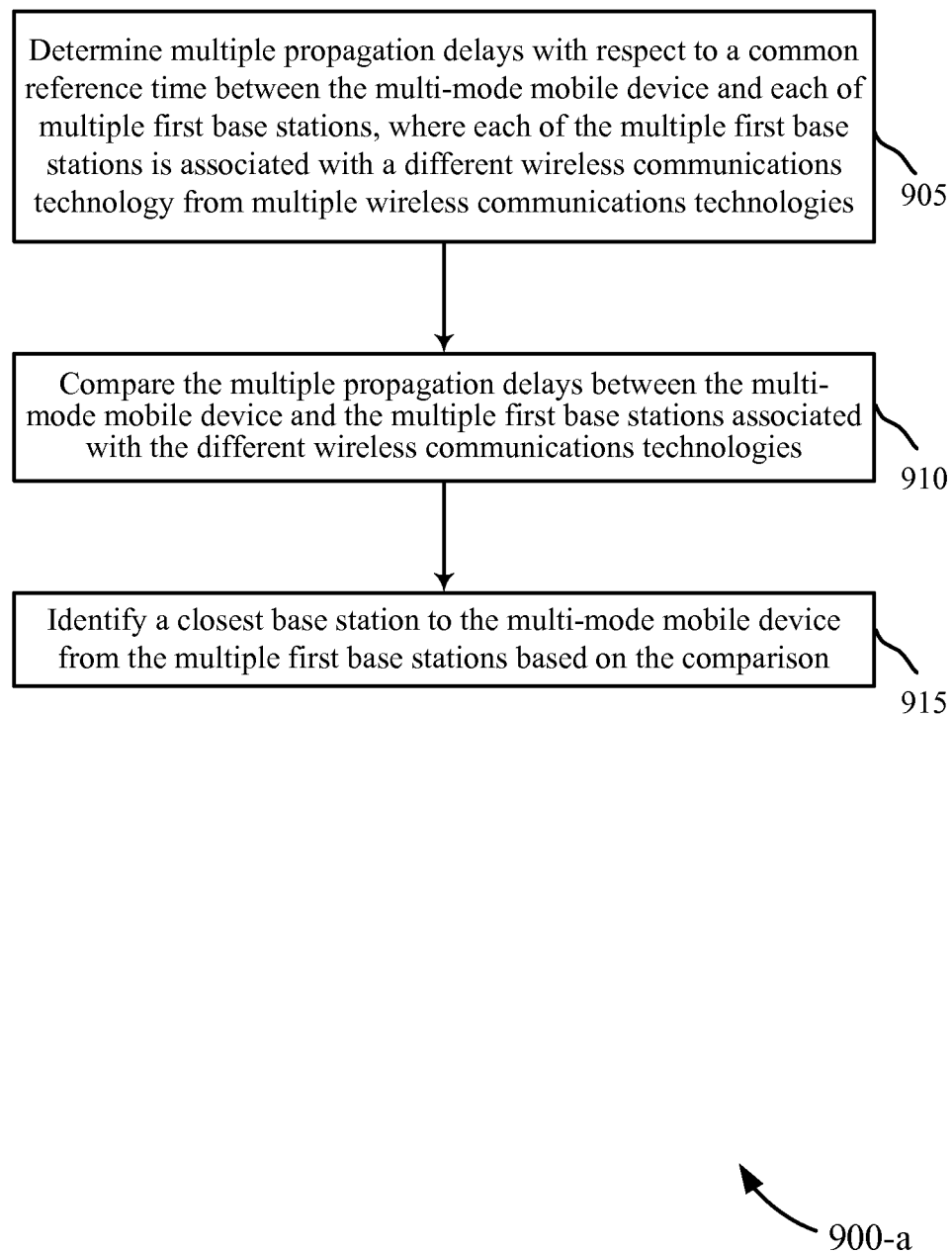
FIG. 9A illustrates a flow diagram of a method for determining a closest base station to a multi-mode mobile device in accordance with various embodiments.

Turning to FIG. 9A, a flow diagram of a method 900-*a* for determining a closest base station to a multi-mode mobile device. Method 900-*a* may be implemented utilizing various wireless communications devices including, but not limited: a mobile device 115 as seen in FIG. 1, FIG. 2, FIG. 5, and/of FIG. 7; a base station 105 as seen in FIG. 1, FIG. 2, FIG. 5, and/or FIG. 8; a core network 125 or controller 120 as seen in FIG. 1, FIG. 2, FIG. 5, and/or FIG. 8; and/or a device 600 of FIG. 6.

At block 905, multiple propagation delays with respect to a common reference time between the multi-mode mobile device and each of multiple first base stations may be determined. Each of the multiple first base stations may be associated with a different wireless communications technology from multiple wireless communications technologies. The multiple propagation delays between the multi-mode mobile device and the multiple first base stations associated with the different wireless communications technologies may be compared at block 910. A closest base station to the multi-mode mobile device from the multiple first base stations may be determined based on the comparison at block 915.

In some embodiments, the method 900-*a* may further include determining position information for the identified closest base station. The position information for the identified closest base station from the multiple first base stations may be utilized as a position of the multi-mode mobile device.

In some embodiments, a handover procedure of the multi-mode mobile device to the closest base station may be performed.

In some embodiments, the method 900-*a* may further include determining multiple propagation delays between the multi-mode mobile device and multiple second base stations. Each base station of the multiple second base stations may be associated with a first wireless communications technology from the multiple wireless communications technologies. The propagation delays between the multi-mode mobile device and the multiple second base stations associated with the first wireless communications technologies may be compared. A closest base station to the multi-mode mobile device from the multiple second base stations may be determined based on comparing the multiple propagation delays between the multi-mode mobile device and the multiple base stations associated with the first wireless communications technologies. The closest base station to the multi-mode mobile device from the multiple second base stations may be utilized as one of the base stations from the multiple base stations.

The position information for the identified closest base station may include a GPS position of the identified closest base station. The multiple wireless communications technologies may include at least two of WiMAX, CDMA 1x, LTE, or EVDO. The multiple wireless communications technologies may include multiple Radio Access Technologies (RAT).

In some embodiments, utilizing the position information for the identified closest base station from the multiple first base stations as the multi-mode mobile device position may include estimating the mobile device position based on the position information for the identified closest base station.

In some embodiments, determining the multiple propagation delays, comparing the multiple propagation delays, and/or identifying the closest base station to the multi-mode mobile device may occur at the multi-mode device. Information regarding the closest base station may be transmitted from the multi-mode device to at least multiple base stations or a core network.

In some embodiments, determining the multiple propagation delays, comparing the multiple propagation delays, and/or identifying the closest base station to the multi-mode mobile device may occur at one or more of the base stations from one of the multiple base stations. Determining the multiple propagation delays at the base station may include receiving multiple receive times transmitted from at least the multi-mode mobile device or the other base stations from the multiple base stations. Multiple transmission times may be determined. Each transmission time may include a respective GPS time. Each respective propagation delay may be determined utilizing the respective receive time and the respective transmission time for each respective base station from the multiple first base stations.

In some embodiments, determining the multiple propagation delays, comparing the multiple propagation delays, and/or identifying the closest base station to the multi-mode mobile device may occur at a core network device.

Figure 9B:
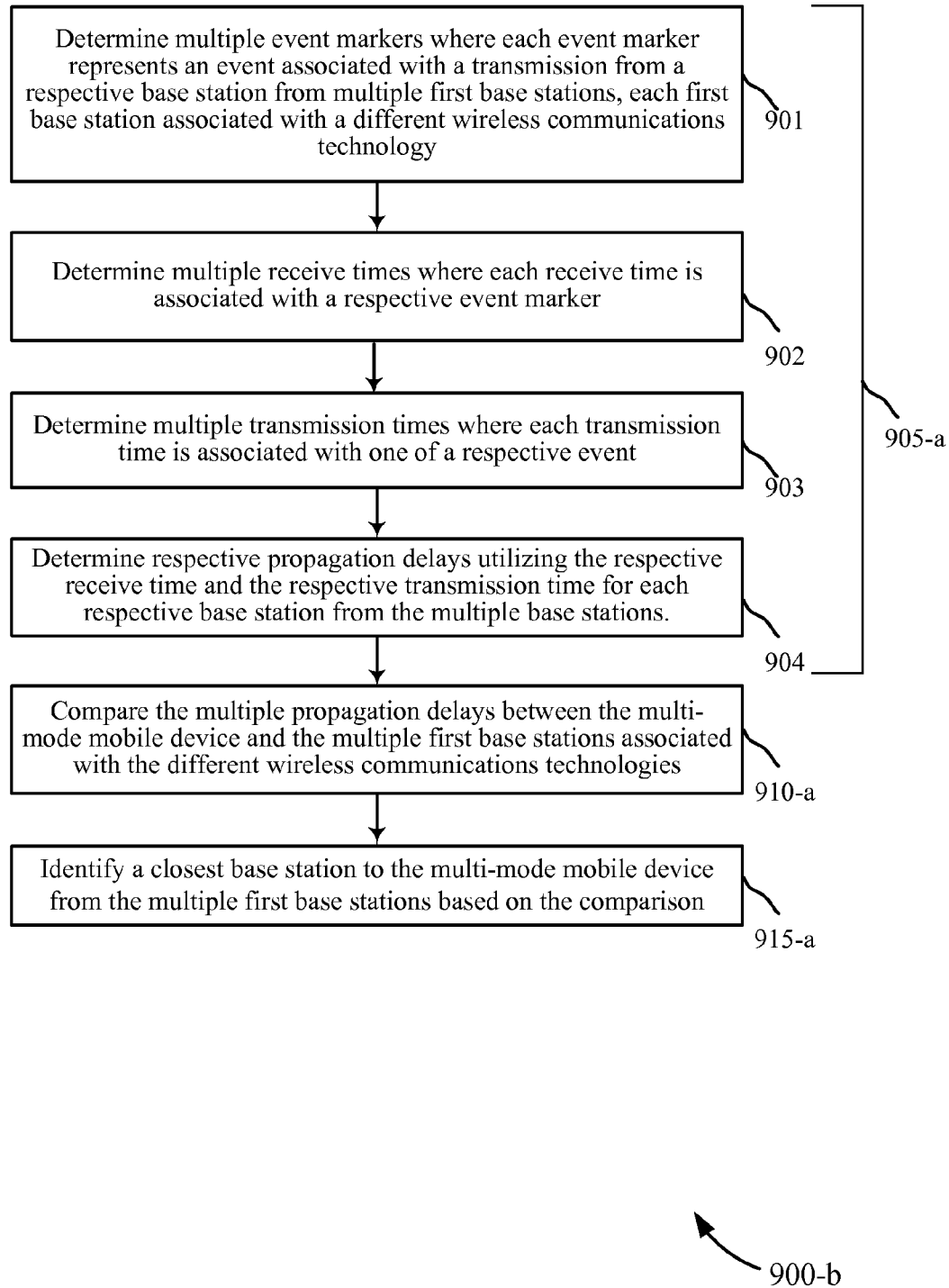
FIG. 9B illustrates a flow diagram of a method for determining a closest base station to a multi-mode mobile device in accordance with various embodiments.

Turning to FIG. 9B, a flow diagram of a method 900-*b* for determining a closest base station to a multi-mode mobile device. Method 900-*a* may be implemented utilizing various wireless communications devices including, but not limited to, a mobile device 115 as seen in FIG. 1, FIG. 2, FIG. 5, and/or FIG. 7, and/or a device 600 of FIG. 6. Method 900-*b* may be an example of method 900-*a*.

At block 901, multiple event markers may be determined. Each event marker may represent an event associated with a transmission from a respective base station from the multiple first base stations. At block 902, multiple receive times may be determined. Each receive time may be associated with a respective event marker. At block 903, multiple transmission times may be determined. Each transmission time may be associated with a respective event. At block 904, each respective propagation delay may be determined utilizing the respective receive time and the respective transmission time for each respective base station from the multiple base stations. Blocks 901, 902, 903, and/or 904 may provide an example of combined blocks 905-*a* that may be an example block 905 of FIG. 9A where multiple propagation delays may be determined with respect to a common reference time between the multi-mode mobile device and each of multiple first base stations where each of the multiple first base stations may be associated with a different wireless communications technology from multiple wireless communications technologies.

The multiple propagation delays between the multi-mode mobile device and the multiple first base stations associated with the different wireless communications technologies may be compared at block 910-*a*, as with to block 910 of FIG. 9A. A closest base station to the multi-mode mobile device from the multiple first base stations may be determined based on the comparison at block 915-*a*, as with block 915 of FIG. 9A.

Each respective transmission time may include a respective GPS time. Each respective receive time may include a time difference with respect to a first receive time from multiple receive times. The first receive time may be the common reference time. The multiple event markers may include at least a frame boundary, a frame tick, or a control channel cycle boundary.

Figure 10:
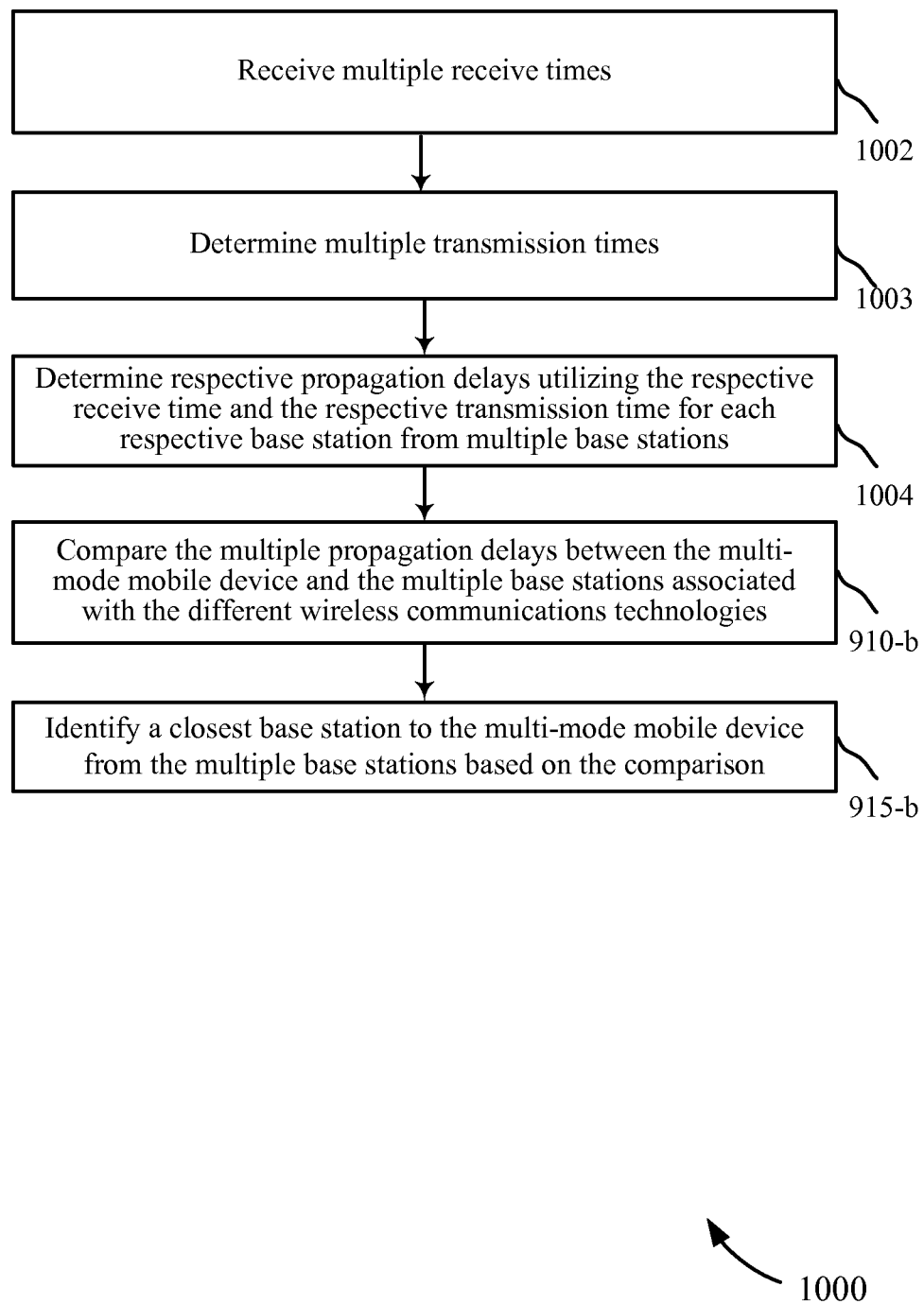
FIG. 10 illustrates a flow diagram of a method for determining a closest base station to a multi-mode mobile device in accordance with various embodiments.

Turning to FIG. 10, a flow diagram of a method 1000 for determining a closest base station to a multi-mode mobile device. Method 1000 may be implemented utilizing various wireless communications devices including, but not limited: a base station 105 as seen in FIG. 1, FIG. 2, FIG. 5, and/or FIG. 8; a core network 125 or controller 120 as seen in FIG. 1, FIG. 2, FIG. 5, and/or FIG. 8; and/or a device 600 of FIG. 6. Method 900-*b* may be an example of method 900-*a* and/or method 900-*b*

At block 1002, multiple receive times may be received. These receive times may be transmitted from the mobile device or the other base stations. The receive times may be associated with different event markers associated with different types of wireless communication transmissions received at the mobile device. At block 1003, multiple transmission times may be determined. Each transmission time may be associated with a different event, such as received transmissions at the mobile device. Each transmission time may be a respective GPS time. For example, the transmission times may be the GPS time for when the transmission was transmitted from a respective base station to the mobile device. In some cases, the mobile device, other base stations, or a core network may transmit the transmission times to the base station and/or core network device or system that may be performing the step of block 1003. At block 1004, multiple propagation delays may be determined utilizing the respective receive time and the respective transmission time for each respective base station from the multiple base stations associated with different wireless communications technologies.

The multiple propagation delays between the multi-mode mobile device and the multiple first base stations associated with the different wireless communications technologies may be compared at block 910-*b*, as with block 910 of FIG. 9A and/or block 910-*a* of FIG. 9B. A closest base station to the multi-mode mobile device from the multiple first base stations may be determined based on the comparison at block 915-*b*, as with block 915 of FIG. 9A and/or block 915-*a* of FIG. 9B.

Various techniques described herein may be used for different wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above, as well as other systems and radio technologies. The description above, however, describes systems that utilize multi-wireless communications technologies, for purposes of examples. WIMAX, CDMA, EVDO, and/or LTE terminology is used in much of the description above, although the techniques are applicable beyond these wireless communications technologies applications.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for determining a closest base station to a multi-mode mobile device, the method comprising:
    determining a plurality of propagation delays with respect to a common reference time between the multi-mode mobile device and each of a first plurality of base stations, wherein each of the first plurality of base stations is associated with a different wireless communications technology from a plurality of wireless communications technologies, wherein determining the propagation delays comprises:
  determining a plurality of event markers, each of the plurality of event markers representing an event associated with a transmission from a base station of the first plurality of base stations;
  determining a plurality of receive times and a plurality of transmission times associated with the event markers; and
  determining the propagation delays based on the receive times and the transmission times;
comparing the plurality of propagation delays between the multi-mode mobile device and the first plurality of base stations associated with the different wireless communications technologies; and
identifying a closest base station to the multi-mode mobile device from the first plurality of base stations based on the comparison.

2. The method of claim 1, further comprising:
determining a position information for the identified closest base station; and
utilizing the position information for the identified closest base station from the first plurality of base stations as a position of the multi-mode mobile device.

3. The method of claim 2, wherein the position information for the identified closest base station includes a GPS position of the identified closest base station.

4. The method of claim 2, wherein utilizing the position information for the identified closest base station from the first plurality of base stations as the multi-mode mobile device position comprises estimating the mobile device position based on the position information for the identified closest base station.

5. The method of claim 1, further comprising:
performing a handover procedure of the multi-mode mobile device to the identified closest base station.

6. The method of claim 1, further comprising:
determining a plurality of propagation delays between the multi-mode mobile device and a second plurality of base stations, wherein each base station of the second plurality of base stations is associated with a first wireless communications technology from the plurality of wireless communications technologies;
comparing the plurality of propagation delays between the multi-mode mobile device and the second plurality of base stations associated with the first wireless communications technologies; and
identifying a closest base station to the multi-mode mobile device from the second plurality of base stations based on comparing the plurality of propagation delays between the multi-mode mobile device and the second plurality of base stations associated with the first wireless communications technologies; and
utilizing the closest base station to the multi-mode mobile device from the second plurality of base stations as one of the base stations from the first plurality of base stations.

7. The method of claim 1, wherein each respective transmission time includes a respective GPS time.

8. The method of claim 1, wherein each respective receive time comprises a time difference with respect to a first receive time from the plurality of receive times.

9. The method of claim 8, wherein the first receive time is the common reference time.

10. The method of claim 1, wherein the plurality of event markers comprises at least a frame boundary, a frame tick, or a control channel cycle boundary.

11. The method of claim 1, wherein the plurality of wireless communications technologies comprises at least two of WiMAX, CDMA 1x, LTE, or EVDO.

12. The method of claim 1, wherein the plurality of wireless communications technologies comprises a plurality of Radio Access Technologies (RAT).

13. The method of claim 1, wherein at least determining the plurality of propagation delays, comparing the plurality of propagation delays, or identifying the closest base station to the multi-mode mobile device occurs at the multi-mode device.

14. The method of claim 13, further comprising:
transmitting information regarding the closest base station from the multi-mode device to at least one of the first plurality of base stations or a core network.

15. The method of claim 1, wherein at least determining the plurality of propagation delays, comparing the plurality of propagation delays, or identifying the closest base station to the multi-mode mobile device occurs at a first base station from of the first plurality of base stations.

16. The method of claim 15, wherein determining the plurality of propagation delays at the first base station comprises:
receiving a plurality of receive times transmitted from at least the multi-mode mobile device or one or more of the other base stations from the first plurality of base stations;
determining a plurality of transmission times; and
determining each respective propagation delay utilizing the respective receive time and the respective transmission time for each respective base station from the first plurality of base stations.

17. The wireless communications device of claim 15, wherein determining the plurality of propagation delays at the first base station comprises:
receiving a plurality of receive times transmitted from at least the multi-mode mobile device or one or more of the other base stations from the first plurality of base stations;
determining a plurality of transmission times; and
determining each respective propagation delay utilizing the respective receive time and the respective transmission time for each respective base station from the first plurality of base stations.

18. The method of claim 1, wherein at least determining the plurality of propagation delays, comparing the plurality of propagation delays, or identifying the closest base station to the multi-mode mobile device occurs at a core network device.

19. An apparatus for determining a closest base station to a multi-mode mobile device, the system comprising:
a means for determining a plurality of propagation delays with respect to a common reference time between the multi-mode mobile device and each of a first plurality of base stations, wherein each of the first plurality of base stations is associated with a different wireless communications technology from a plurality of wireless communications technologies, wherein the means for determining the propagation delays comprises:
  a means for determining a plurality of event markers, each of the plurality of event markers representing an event associated with a transmission from a base station of the first plurality of base stations;

a means for determining a plurality of receive times and a plurality of transmission times associated with the event markers; and a means for determining the propagation delays based on the receive times and the transmission times;

a means for comparing the plurality of propagation delays between the multi-mode mobile device and the first plurality of base stations associated with the different wireless communications technologies; and a means for identifying a closest base station to the multi-mode mobile device from the first plurality of base stations based on the comparison.

20. The apparatus of claim 19, further comprising:

a means for determining a position information for the identified closest base station; and a means for utilizing the position information for the identified closest base station from the first plurality of base stations as a position of the multi-mode mobile device.

21. The apparatus of claim 19, further comprising:

a means for performing a handover procedure of the multi-mode mobile device to the identified closest base station.

22. A wireless communications device configured for determining a closest base station to a multi-mode mobile device, the wireless communications device comprising:

a propagation delay determination module configured to determine a plurality of propagation delays with respect to a common reference time between the multi-mode mobile device and each of a first plurality of base stations, wherein each of the first plurality of base stations is associated with a different wireless communications technology from a plurality of wireless communications technologies, wherein determining the propagation delays comprises:

determining a plurality of event markers, each of the plurality of event markers representing an event associated with a transmission from a base station of the first plurality of base stations;

determining a plurality of receive times and a plurality of transmission times associated with the event markers; and determining the propagation delays based on the receive times and the transmission times;

a propagation delay comparison module configured to compare the plurality of propagation delays between the multi-mode mobile device and the first plurality of base stations associated with the different wireless communications technologies; and a closest base station identification module configured to identify a closest base station to the multi-mode mobile device from the first plurality of base stations based on the comparison.

23. The wireless communications device of claim 22, further comprising:

a position information module configured to:

determine a position information for the identified closest base station; and utilize the position information for the identified closest base station from the first plurality of base stations as a position of the multi-mode mobile device.

24. The wireless communications device of claim 23, wherein the position information for the identified closest base station includes a GPS position of the identified closest base station.

25. The wireless communications device of claim 23, wherein utilizing the position information for the identified closest base station from the first plurality of base stations as the multi-mode mobile device position comprises estimating the mobile device position based on the position information for the identified closest base station.

26. The wireless communications device of claim 22, further comprising:

a handover module configured to perform a handover procedure of the multi-mode mobile device to the identified closest base station.

27. The wireless communications device of claim 22, wherein:

the propagation delay determination module is further configured to determine a plurality of propagation delays between the multi-mode mobile device and a second plurality of base stations, wherein each base station of the second plurality of base stations is associated with a first wireless communications technology from the plurality of wireless communications technologies;

the propagation delay comparison module is further configured to compare the plurality of propagation delays between the multi-mode mobile device and the second plurality of base stations associated with the first wireless communications technologies; and the closest base station identification module is further configured to identify a closest base station to the multi-mode mobile device from the second plurality of base stations based on comparing the plurality of propagation delays between the multi-mode mobile device and the second plurality of base stations associated with the first wireless communications technologies; and further comprising:

a position information module configured to utilize the closest base station to the multi-mode mobile device from the second plurality of base stations as one of the base stations from the first plurality of base stations.

28. The wireless communications device of claim 22, wherein each respective transmission time includes a respective GPS time.

29. The wireless communications device of claim 22, wherein each respective receive time comprises a time difference with respect to a first receive time from the plurality of receive times.

30. The wireless communications device of claim 29, wherein the first receive time is the common reference time.

31. The wireless communications device of claim 22, wherein the plurality of event markers comprises at least a frame boundary, a frame tick, or a control channel cycle boundary.

32. The wireless communications device of claim 22, wherein the plurality of wireless communications technologies comprises at least two of WiMAX, CDMA 1x, LTE, or EVDO.

33. The wireless communications device of claim 22, wherein the plurality of wireless communications technologies comprises a plurality of Radio Access Technologies (RAT).

34. The wireless communications device of claim 22, wherein the wireless communications device comprises the multi-mode mobile device.

35. The wireless communications device of claim 34, further comprising:

a transmitter module configured to transmit information regarding the closest base station from the multi-mode device to at least one of the first plurality of base stations or a core network.

36. The wireless communications device of claim 22, wherein the wireless communications device comprises a first base station from the first plurality of base stations.

37. The wireless communications device of claim 22, wherein the wireless communications device comprises a core network device.

38. A computer program product for determining a closest base station to a multi-mode mobile device comprising:
  a non-transitory computer-readable medium comprising:
    code for determining a plurality of propagation delays with respect to a common reference time between the multi-mode mobile device and each of a first plurality of base stations, wherein each of the first plurality of base stations is associated with a different wireless communications technology from a plurality of wireless communications technologies, wherein the code for determining the propagation delays comprises:
      code for determining a plurality of event markers, each of the plurality of event markers representing an event associated with a transmission from a base station of the first plurality of base stations;
      code for determining a plurality of receive times and a plurality of transmission times associated with the event markers; and
      code for determining the propagation delays based on the receive times and the transmission times;
    code for comparing the plurality of propagation delays between the multi-mode mobile device and the first plurality of base stations associated with the different wireless communications technologies; and
    code for identifying a closest base station to the multi-mode mobile device from the first plurality of base stations based on the comparison.

39. The computer program product of claim 38, further comprising:
  code for determining a position information for the identified closest base station; and
  code for utilizing the position information for the identified closest base station from the first plurality of base stations as a position of the multi-mode mobile device.

40. The computer program product of claim 38, further comprising:
  code for performing a handover procedure of the multi-mode mobile device to the identified closest base station.

* * * * *